United States Patent [19]

Mimura

[11] Patent Number: 5,533,424

[45] Date of Patent: Jul. 9, 1996

[54] DIFFERENTIAL GEAR

[76] Inventor: Kenji Mimura, 29-1105, Wakabadai 4-chome, Asahi-ku, Yokohama, Kanagawa-ken, 241, Japan

[21] Appl. No.: 234,874

[22] Filed: Apr. 21, 1994

[30] Foreign Application Priority Data

Apr. 22, 1993 [JP] Japan .................................. 5-096087
Sep. 10, 1993 [JP] Japan .................................. 5-225920

[51] Int. Cl.⁶ ............................................. F16H 48/00
[52] U.S. Cl. ........................... 74/650; 475/184; 475/196; 475/231
[58] Field of Search ............................ 74/650; 475/231, 475/236, 243, 184, 189, 191, 192, 196; 464/103

[56] References Cited

U.S. PATENT DOCUMENTS

| | | | |
|---|---|---|---|
| 1,254,782 | 1/1918 | Dorman | 74/650 |
| 2,338,215 | 1/1944 | Summy | 74/650 |
| 2,967,438 | 1/1961 | Altmann | 74/650 |
| 4,269,086 | 5/1981 | Altmann | 475/231 |
| 4,867,009 | 9/1989 | Hudson | 74/650 |
| 5,362,283 | 11/1994 | Jenkins | 475/184 |
| 5,423,663 | 6/1995 | Fukui | 464/103 X |

FOREIGN PATENT DOCUMENTS

| | | | |
|---|---|---|---|
| 85552 | 3/1990 | Japan | 74/650 |
| 1772487 | 10/1992 | U.S.S.R. | 475/196 |
| 2034423 | 6/1980 | United Kingdom | 475/184 |

*Primary Examiner*—Khoi Q. Ta
*Attorney, Agent, or Firm*—Pollock, Vande Sande & Priddy

[57] ABSTRACT

This invention provides a differential gear that permits a sure differential limitation effect to be obtained with a simple structure and that is both compact in size and low in price. That is, when a rotational difference occurs on a pair of output-side rotary bodies arranged in opposite form to each other on the shaft center of an input-side rotary body, a differential rotation of each output-side rotary body is achieved by interconnecting the rotary motion of each output-side rotary body by means of numerous grooves and numerous balls fitted to these grooves. At this time, when the force necessary to cause a rotational difference is given to each output-side rotary body only from one output-side rotary body, the balls or grooves of the driven side at differential rotation cause the grooves or balls of the driving side to follow their own motion on the other output-side rotary body. Consequently, the reaction force caused at this time acts as a resistance to limit the differential rotation of each output-side rotary body. Accordingly, this invention permits a very stable differential limitation effect of torque sensitizing type to be obtained without requiring any special mechanism for this purpose.

2 Claims, 31 Drawing Sheets

(a)

(b)

(a)

(b)

DIFFERENTIAL GEAR

BACKGROUND OF THE INVENTION

1. Field of the Invention

This invention relates to a differential gear that allows a rotational difference between the left-hand and right-hand driving wheels or between the front and rear driving wheels of a vehicle.

2. Description of the Prior Art

In the past, the differential gear used for the driving force transmission system of vehicles has been a system that allows a rotational difference between the left-hand and right-hand driving wheels when a vehicle travels on curves or the rotational difference between the front and rear driving wheels of a four-wheel drive vehicle. However, when only one driving wheel runs on a surface with an extremely low coefficient of friction such as snow or sand, this wheel races and the whole driving force is lost with the result that the vehicle cannot escape from such a surface.

If the load on the inner wheel is substantially reduced by centrifugal force when the vehicle travels on a curve at high speed, the driving force to negotiate the curve at high speed is easily lost. To make up for such a drawback, some vehicles are provided with a differential limitation mechanism, for example, of a clutch disk crimping type, thereby limiting the differential rotation of each driving wheel under a specified condition. However, this type indicates a sudden differential limitation effect with the increase of rotational difference and mutually binds individual wheels when no driving force is input from the engine side. This makes it difficult to combine in a system in which independency is required for the rotation of each wheel such as in the antilock brake system.

For this reason, a differential limitation mechanism of rotation speed sensitizing type using a viscous coupling is often used of late to maintain independency for the rotation of each driving wheel limiting the differential rotation under a specified driving condition. The viscous coupling is a type of a viscous clutch which transmits torque by means of the shear resistance of a viscous fluid (e.g., silicone oil), so a smooth differential imitation effect can be obtained in accordance with each rotational difference.

A differential gear having a mechanism to limit the differential rotation only at driving without limiting each driving wheel at non-driving, for example, a torque sensitizing type combined with a worm gear is already known and described in Provisional Publication No. 271926/92 of the Japanese Patent Application Official Gazette. In this type, a pair of screw-shaped worms that can be rotated independently of each other on the same shaft are provided in a gear with multiple worm wheels having a rotary shaft perpendicular to it. When each worm is rotated, the worm wheels can rotate smoothly. However, if the worms are rotated from the worm wheel side, this is difficult. This character is peculiar to the worm gear. Accordingly, this type is provided with the character that differential rotation and a differential limitation effect are obtained in accordance with each condition.

One drawback of the differential gear with a differential limitation mechanism of the rotation speed sensitizing type, represented by the viscous coupling, however, is that the torque transmissibility depends on the viscosity of a fluid, and this viscosity varies with temperature changes and cannot provide a stable differential limitation effect at all times. Another problem with this type is that a time lag occurs between the occurrence of a rotational difference and the execution of differential limitation, thereby making it impossible to instantly cope with running operation changes.

On the other hand, the differential gear using worm gears performs the differential limitation mechanically, so that a stable differential limitation effect can be obtained. Its drawback, however, is that its structure is complicated with numerous parts whose working and assembly require high precision, and the whole system size is large compared with the allowable torque.

BRIEF SUMMARY OF THE INVENTION

In view of the foregoing problems, the main object of this invention is to obtain a differential limitation effect with a simple structure, and to provide a smallsized low-priced differential gear.

To attain the object of the invention, a differential gear is provided with an input-side rotary body rotating around the shaft center in response to an externally-input driving force, and a pair of output-side rotary bodies are arranged on the shaft of the input-side rotary body, that allows a rotational difference occurring on each output-side rotary body due to the mutual rotary motion of the said individual output-side rotary bodies the differential gear is provided with numerous grooves to interconnect the mutual rotary motion of individual output-side rotary bodies and numerous balls that can freely roll and be fitted to these grooves.

With this structure, when the input-side rotary body is rotated around the shaft center by the externally-input driving force, the rotating force is transmitted to each output-side rotary body. At this time, if a rotational difference occurs between individual output-side rotary bodies, the mutual rotary motion of these output-side rotary bodies are interconnected by the numerous grooves and numerous fitted balls, thus attaining a differential rotation of each output-side rotary body. At this time, if the required force to cause a rotational difference to each output-side rotary body is given to one output-side rotary body, the balls or grooves of the driven side at differential rotation cause the grooves and balls of the driving side to follow their own motion in the other output-side rotary body, so that the rotational difference between individual output-side rotary bodies is limited by the reaction force occurring at this time as resistance. In this case, the magnitude of the reaction force given to the balls by the grooves, namely, the magnitude of the differential limitation effect, varies with the size of the contact angle between the balls and grooves.

Accordingly, this invention does not require any special mechanism to obtain a differential limitation effect and permits a very stable differential limitation effect to be obtained of the torque sensitizing type, thereby resulting in a unique, compact, low-priced differential gear. This invention also permits the optional setting of a differential limitation effect in accordance with each usage, thus having the merit of excellent versatility.

EXEMPLARY EMBODIMENT

Figure 1:
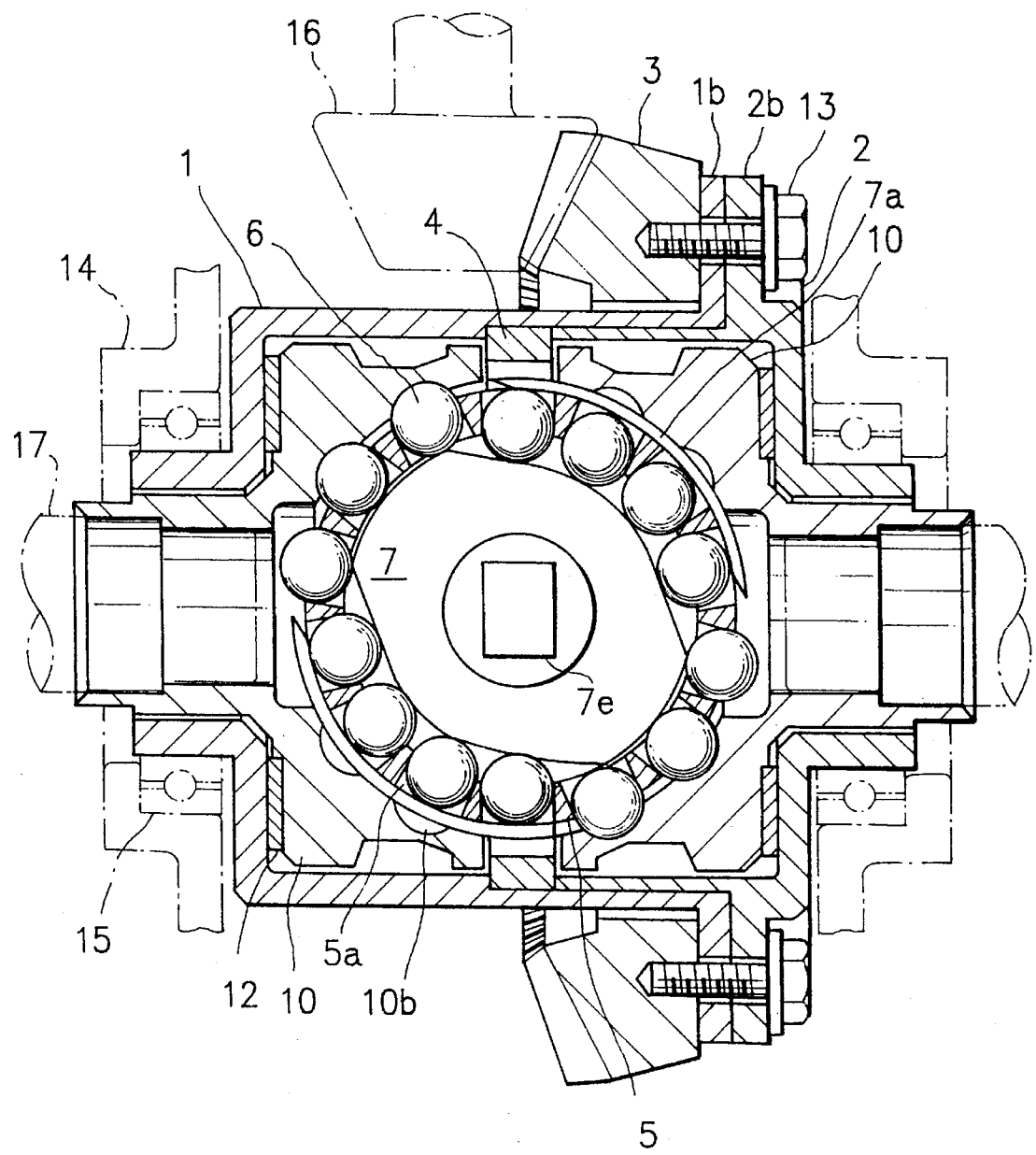
FIG. 1 is a side sectional view of the differential gear, indicating the first exemplary embodiment of this invention.
Figure 2:
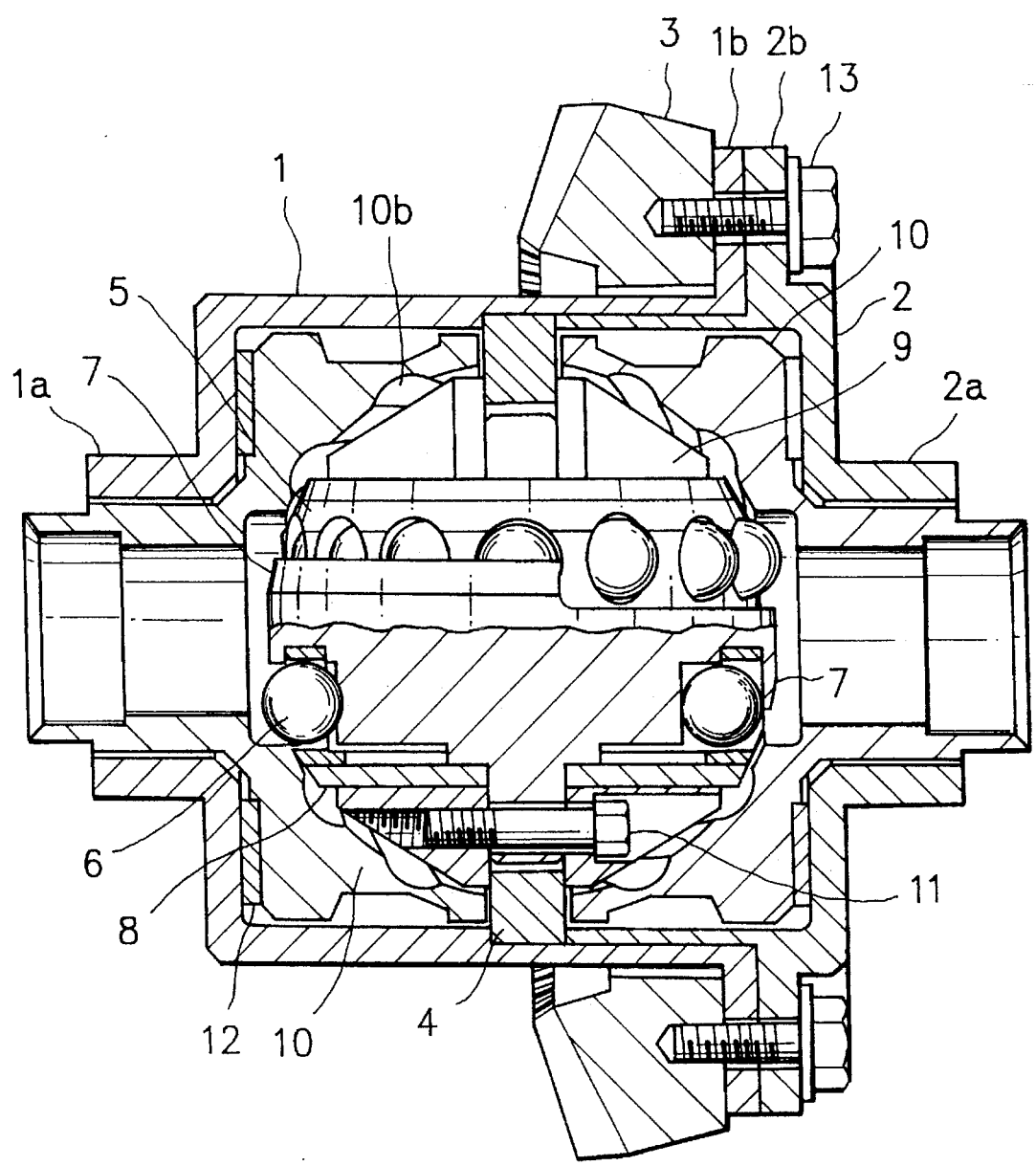
FIG. 2 is a top sectional view of the differential gear.

FIGS. 1 to 11 show the first exemplary embodiment of this invention. FIG. 1 is a side sectional view of the differential gear. FIG. 2 is a plan sectional view of the same. FIGS. 3 to 7 are partial exploded perspective views of the same.

This differential gear consists of a gear case 1 forming an input-side rotary body, a gear case cover 2 blocking one end of the gear case 1, a ring gear installed on the outer circumference of the gear case 1, a centerplate 4 fixed in the middle of the gear case 1, a pair of ball rings 5 opposite to the direction perpendicular to the shaft center of the gear case 1, numerous balls 6 retained at each ball ring 5 in freely-movable form, a ring holder 7 retaining each ball ring 5 in freely-rotatable form, a ring cover 8 covering both sides of the ring holder 7, a total of four fixing blocks 9 for fixing the ring holder 7 at the centerplate 4, and a pair of output shafts 10 being output-side rotary bodies opposite to the direction of the shaft center of the gear case 1 interposed between each ball ring.

The gear case 1 is composed of a cylindrical material with an opening at one end. At its other end, a bearing 1a passing through one output shaft 10 is provided. At the opening of the gear case 1, a flange 1b is formed and numerous holes 1c for bolt insertion are provided on the flange 1b. A receiver 1d to hold the centerplate 4 is provided on the inside of the gear case 1.

The gear case cover 2 is shaped in discoidal form. At its center, a bearing 2a passing through the other output shaft 10 is provided. A flange 2b is formed at the edge of the gear case cover 2. Numerous holes 2c for bolt insertion are provided on the flange 2b. An insertion section 2d to be inserted into the gear case 1 is provided on the inside of the gear case 2.

In the ring gear 3, one end face is formed by gear, and numerous tapped holes 3a for bolt screwing are provided on the other end face. The internal diameter of the ring gear 3 is formed larger than the external diameter of the gear case 1.

The centerplate 4 is shaped in discoidal form and a part of its outer circumferential surface is shaped in accordance with the receiver 1d of the gear case 1. An opening to house the ring holder 5 is provided in the middle of the centerplate 4. At both ends of this opening, a receiving groove 4a to fix the ring holder 7 is provided. In the vicinity of each receiving groove 4a, a hole 4b for bolt insertion is provided.

Each of the ball rings 5 has numerous ball holes 5a to house the balls 6 and each ball hole 5a is arranged at equal intervals in a line in the circumferential direction of the ball rings 5.

Each ball 6 has a slightly smaller external diameter than the ball holes 5a of the ball ring 5 and is housed in each ball hole 5a in freely-rollable form.

The ring holder 7 is interposed between individual ball rings 5. At both its ends, each ball ring 5 is retained in freely-rotatable form. On both surfaces of the ring holder 7, a circular-arc-shaped guard wall 7a in contact with the outside of the balls 6 retained by the ball rings is formed. A total of two guard walls 7a are provided at intervals in the circumferential direction of the ring holder 7 and arranged alternately on both surfaces of the ring holder 7. On both surfaces of the ring holder 7, a ball guide 7b in contact with the inside of the balls 6 is provided and the circumference of the ball guide 7b consists of a total of two small-diameter sections 7c and a total of two large-diameter sections 7d positioned between the small-diameter sections 7c. Each small-diameter section 7c and each large-diameter section 7b are made in continuous form, and each small-diameter section 7c is provided at the position corresponding to the guard wall 7a. In the middle of each ball guide 7b, a square-shaped boss 7e fitted to the receiving groove 4a of the centerplate 4 is provided.

Each ring cover 8 is shaped in discoidal form and provided on both sides of the ring holder 7. A square-shaped hole 8a is provided in the middle of each ring cover 8 and the boss 7d of the ring holder 7 is inserted into the hole 8a. Each fixing block 9 is arranged on both sides of the centerplate 4 and on both sides of the ring holder 7, respectively.

In one fixing block 9 positioned on both sides of the centerplate 4, a hole 9a for bolt insertion is provided. In the other fixing block 9, a screw hole 9b for bolt screwing is provided.

Each output shaft 10 extends toward the shaft center of the gear case 1. On each opposite surface, a spherical section 10a with concave shape is provided. In the spherical section 10a, numerous ball grooves 10b fitted to the balls 6 are formed, and each ball groove 10b describes a curve with a specified curvature curved in the same direction. In this case, the output shafts themselvess are the same shape, but after assembly, are arranged in the opposite direction to the other, so that the ball groove 10b of each output shaft 10 is curved in the opposite direction to the shaft center of each output shaft 10.

Figure 3:
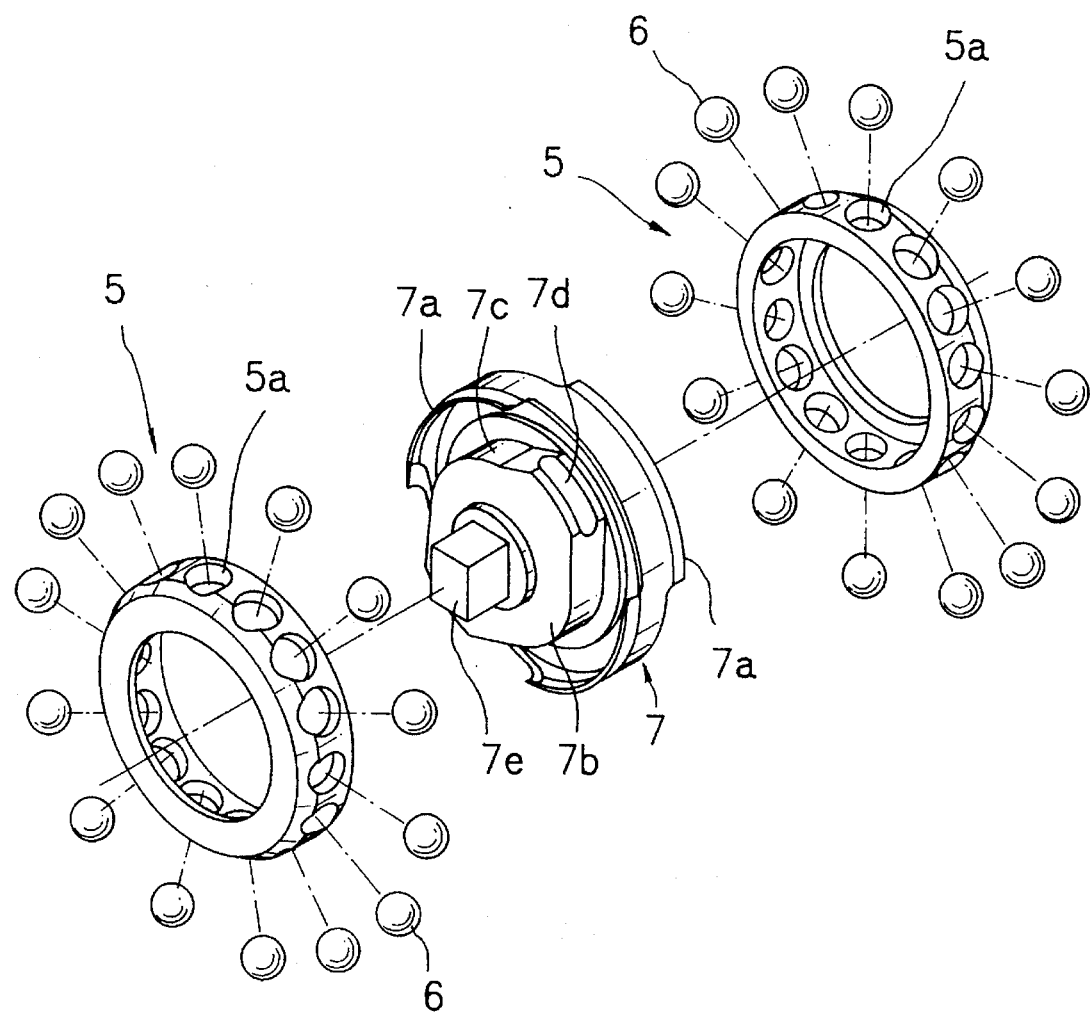
FIG. 3 is a partial perspective exploded view of the differential gear.
Figure 4:
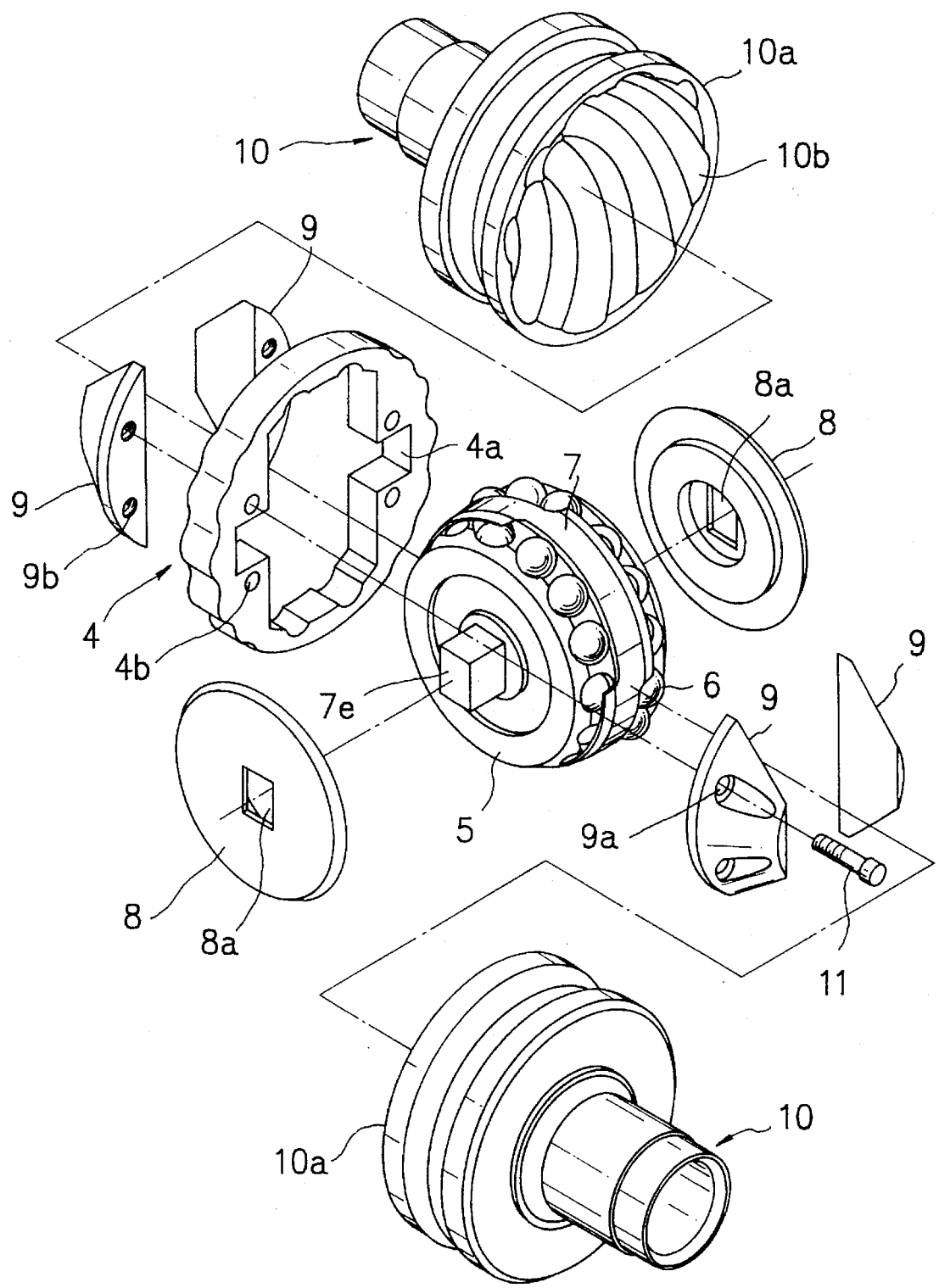
FIG. 4 is a partial perspective exploded view of the differential gear.

In the above construction, as shown in FIGS. 3 and 4, each ball ring 5 housing each ball 6 is retained on both surfaces of the ring holder 7 and each ball ring 5 is covered with each ring cover 8. At this time, each boss 7c of the ring holder 7 protrudes from the hole 8a of each ring cover 8. In this condition, the ring holder 7 is housed inside the centerplate 4, each boss 7e is fitted to the receiving groove 4a, and each fixing block 9 is installed on the centerplate 4 with a total of four bolts 11. That is, each bolt 11 is inserted into the hole 9a of one fixing block 9, passes through the hole 4b of the centerplate 4, and is screwed in the tapped hole 9b of the other fixing block 9. As a result, the boss 7e fitted to the receiving groove 4a of the centerplate is nipped by each fixing block and the ring holder 7 is securely fixed onto the centerplate 4. At this time, the outer circumference of the ball guide 7b is brought into contact with the inner side of each ball 6. On each ball 6, the position for the direction of diameter of the ball ring 5 is controlled by the small-diameter section 7c and large-diameter section 7d of the ball guide 7b. That is, the ball 6 positioned at the small-diameter section 7c of the ball guide 7b is positioned at an inner side rather than the outer circumferential surface of the ball ring 5 and the outer circumference of the ball ring 5 is covered with the guard wall 7a of the ring holder 7, so that the ball 6 does not protrude outside the ball ring 5. The ball 6 positioned at the large-diameter section 7d of the ball guide 7b is deflected outside the ball ring 5 by the large-diameter section 7d and a part of it protrudes outside the ball ring 5. Both sides of the centerplate 4 are covered with the spherical section 10a of each output shaft 10 and the balls 6 protruding outside the ball ring 5 are fitted to the ball grooves 10b of each spherical section 10a.

Figure 5:
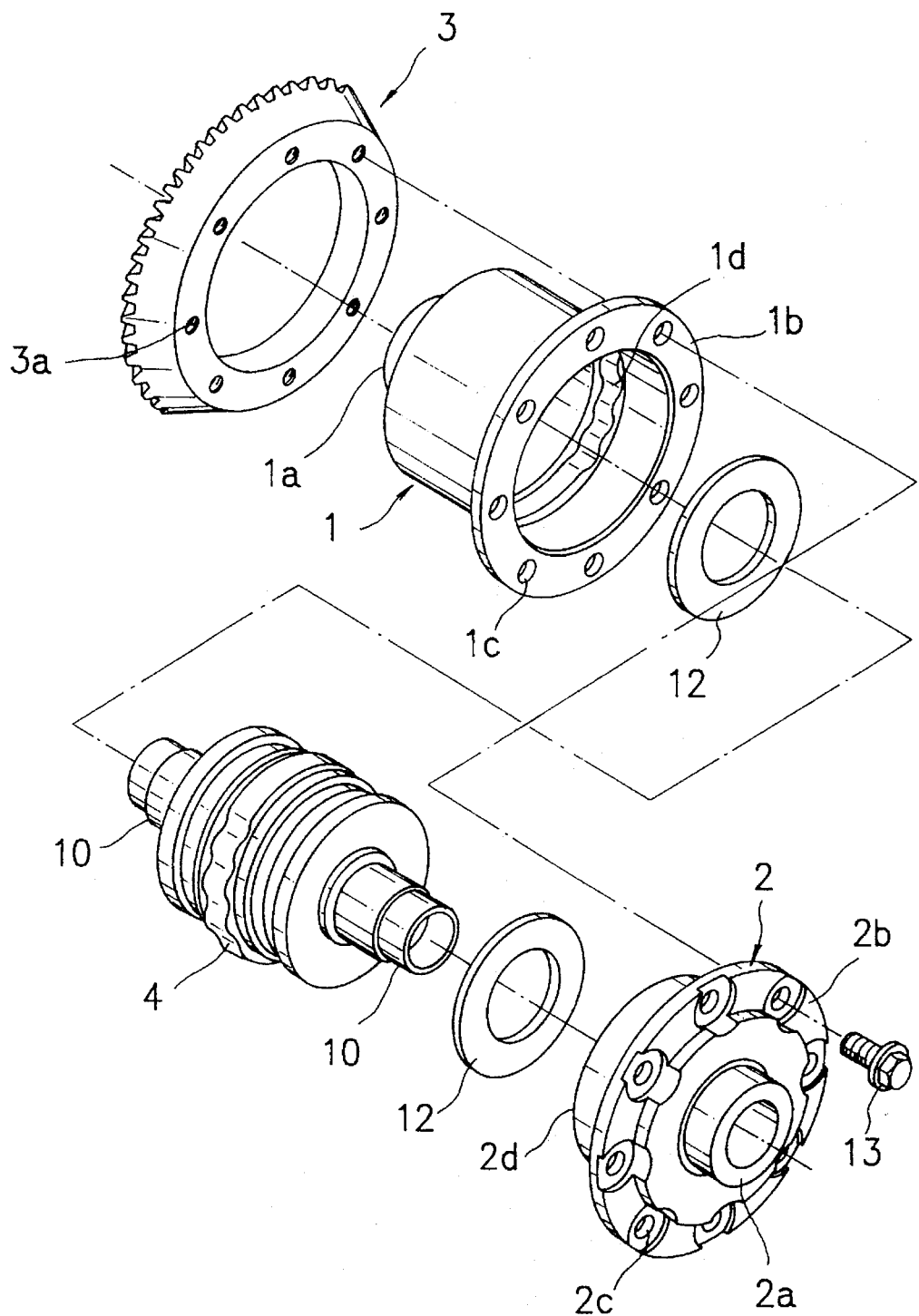
FIG. 5 is a partial perspective exploded view of the differential gear.

The assembly formed in this way is housed in the gear case 1 as shown in FIG. 5. That is, one output shaft 10 is inserted into the bearing 1a of the gear case 1 through the thrust washer 12 and the centerplate 4 is fitted to the receiver 1d of the gear case 1. In this condition, the gear case cover 2 is installed in the gear case 1 and the other output shaft 10 is inserted into the bearing 2a of the gear case cover 2 through the thrust washer 12. At this time, the centerplate 4 is nipped by the insertion section 2d of the gear case cover 2 and the centerplate 4 is securely fixed on the gear case 1.

The ring gear 3 is installed on the flanges 1b and 2b of the gear case 1 and gear case cover 2 with a bolt 13. That is, the bolt 13 is inserted into the hole 2c of the flange 2b, passes through the bole 1c of the flange 1b, and is screwed into the tapped hole 3a of the ring gear 3.

The differential gear constructed in the above way is, for example, provided in the power transmission mechanism of the left/right driving wheel of a vehicle. That is, this differential gear is housed in a power transmission mechanism case 14 (illustration is partly omitted) as shown by the chain line in FIG. 1 and the the bearing 1a of the gear case 1 and the gear 2a of the gear case cover 2 are retained by a case 14 through a bearing 15. A pinion gear 16 to transmit the driving force from the engine is fitted to the ring gear 3 and a driving shaft 17 of the left/right driving wheel is connected to each output shaft 10.

Figure 6:
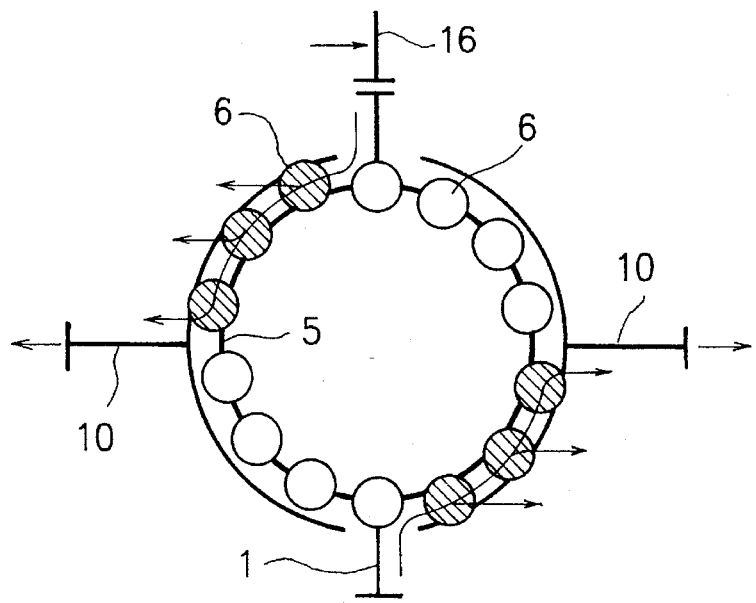
FIG. 6 is an explanatory drawing indicating the driving force transmission status.
Figure 7:
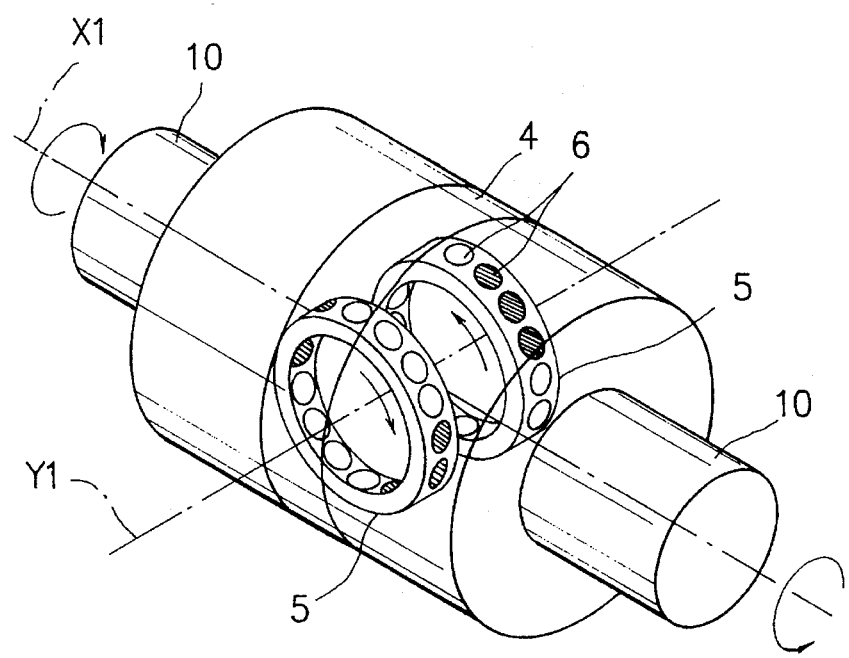
FIG. 7 is an operational explanatory drawing indicating the differential status.
Figure 8:
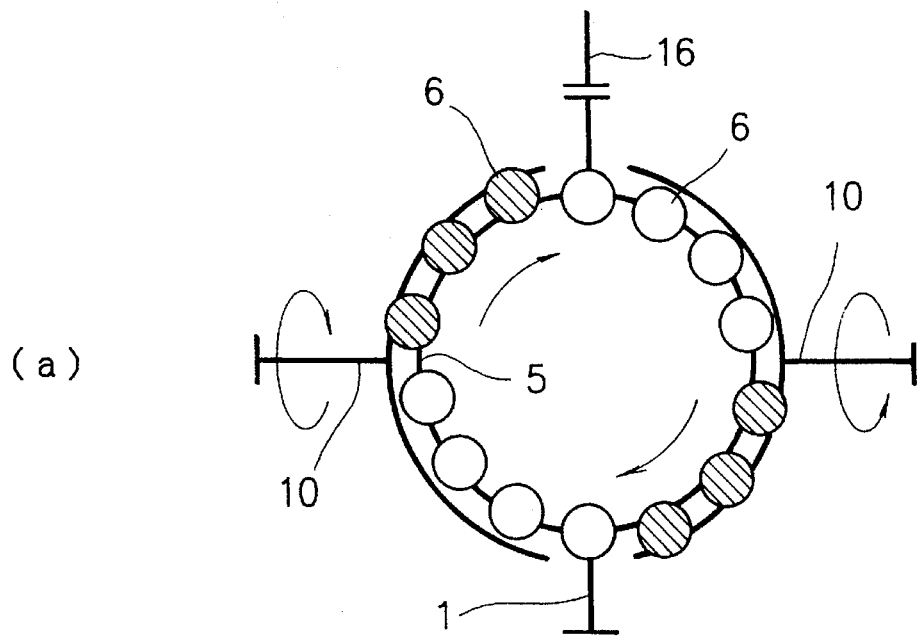
FIG. 8 is an operational explanatory drawing of each ball ring in the differential status.
Figure 8:
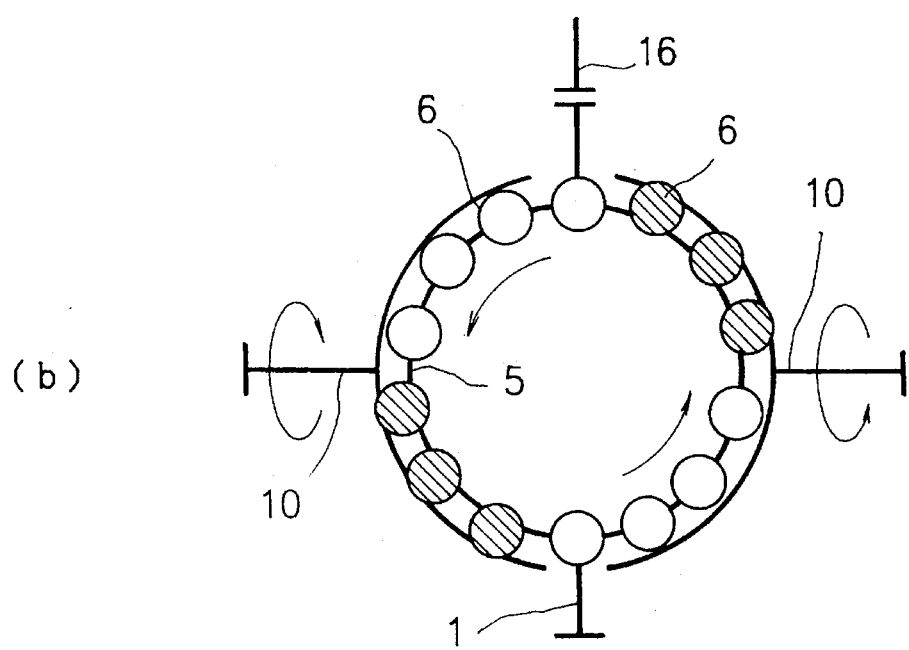

In the following, the operation of the said differential gear is explained for the case where no rotational difference occurs on each driving wheel, the case where a rotational difference occurs in each driving wheel, and the case where one driving wheel is apt to race, respectively. In the case where no rotational difference occurs in each driving wheel when the vehicle travels straight on the road surface with sufficient friction force, the torque of the pinon gear 15 is transmitted to the gear case 1 through the ring gear 3 and the gear case 1 rotates around the shaft center. When the gear case rotates, the centerplate 4, ring holder 7 and each ball ring 5 rotate around the shaft center of the gear case 1 and this torque is transmitted to the spherical section 10a of each output shaft 10 through the ball 6 fitted with the ball groove 10b of each output shaft 10. In this case, taking one ball ring 5 as an example, as shown in FIG. 6, the torque is transmitted to each output shaft 10 through three balls 3 each (two balls each depending on the rotation angle of the ball ring 5) positioned symmetrically to the center of the ball bearing 5 as shown by hatching in the figure, and each output shaft 10 rotates in a form united with the gear case 1.

Figure 9:
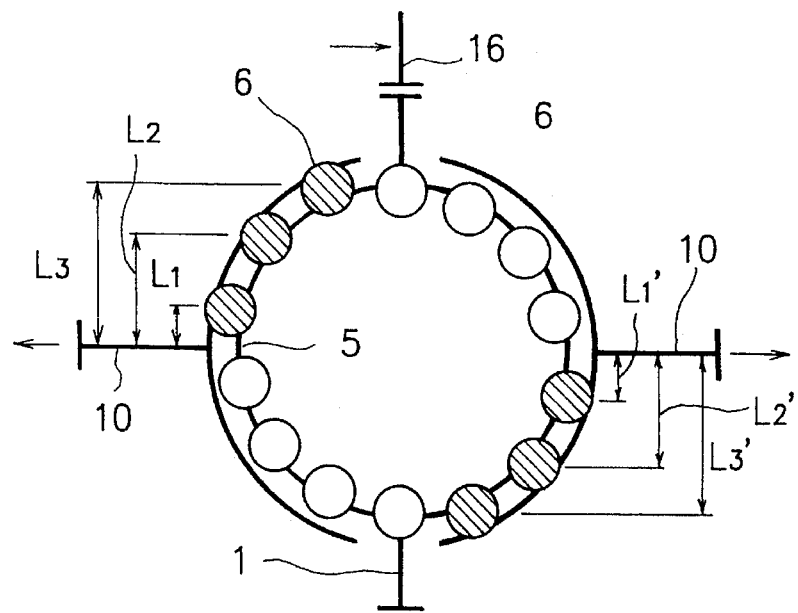
FIG. 9 is an explanatory drawing indicating the torque transmission status.

In the case where a rotational difference occurs in each output shaft 10 in the status in which the torque is transmitted equally to each driving wheel, for example, when the vehicle turns on the road surface with sufficient friction force, each output shaft 10 rotates in the opposite direction to each other, so that the ball groove lob of each output shaft 10 rolls the ball 6 and each ball ring 5 rotates in the opposite direction to each other around the shaft X2 perpendicular to the rotary shaft X1 of each output shaft 10. With this, the rotational difference of each output shaft can be attained. In this case, if one output shaft 10 rotates clockwise and the other output shaft 10 rotates counterclockwise, one ball ring 5 rotates clockwise as shown in FIG. 8(a), and the other ball ring 5 rotates counterclockwise as shown in FIG. 8(b). When each ball ring 5 rotates, each ball 6 moves along the ball guide 7b of the ring holder 7 but the ball guide 7b does not rotate against the ball ring 5. Accordingly, when the ball 6 positioned in the large-diameter section 7b of the ball guide 7b moves to the small-diameter section 7c, the subsequent ball 6 moves from the small-diameter section 7c to the large-diameter section 7d. In this case, attention must be paid to the following point. The direction in which the ball groove 10b moves the ball 6 on one output shaft 10 is based on the center of the spherical section 10a. For this reason, if all the balls 6 are fitted to the ball grooves 10b, the direction in which the ball grooves 10b move the balls 6 becomes opposite to the center of the spherical section 10b on the same ball ring 5, so that the ball ring cannot be rotated. Therefore, on the same ball ring, only the balls 6 positioned on one side of the center of the spherical section 10a are fitted to the ball grooves 10b, so that the ball ring 5 can be rotated. When the ball ring 5 rotates, the position of each ball 6 changes, so that the vertical distance from the center of the ball 6 transmitting the driving force to the shaft center of each output shaft 10 is not constant. However, supposing that the vertical distances from the balls 6 transmitting the driving force to the shaft center of each output shaft 10 are specified as L1, L2 and L3 on one output shaft 10 and as L1', L2' and L3' on the other output shaft as shown in FIG. 9, the position of each ball 6 becomes symmetrical on each output shaft, so the relationship of L1=L1', L2=L2' and L3=L3' is always kept even if the ball ring rotates. Consequently, the torque to be transmitted to each output shaft becomes equal in any differential condition.

Next, in the case where only one driving wheel is apt to race, for example, when one driving wheel loses friction force against the road surface, the force necessary to cause a rotational difference at each output shaft from only one output shaft 10, where the balls 6 are the driven side at differential rotation, causes the ball grooves 10b, which are the driving side, to follow their own motion. For this reason, these ball 6 receive reaction force from the ball grooves 10b and this works as a resistance to limit the differential rotation of each shaft 10. Accordingly, even if one driving wheel slips, the torque can be transmitted at a different rate for each of the left and right sides without reducing the torque of the other driving wheel, thereby preventing a decrease of the whole driving force. When force is applied from the balls 6 to the ball grooves 10b as described before, a thrust load is generated in the direction in which each output shaft 10 is separated from the other. Consequently, each output shaft 10 is pushed against the thrust washer 12 and sliding friction occurs between the output shaft 10 and thrust washer 12. The differential rotation of each output shaft 10 is limited by this friction resistance.

Figure 10:
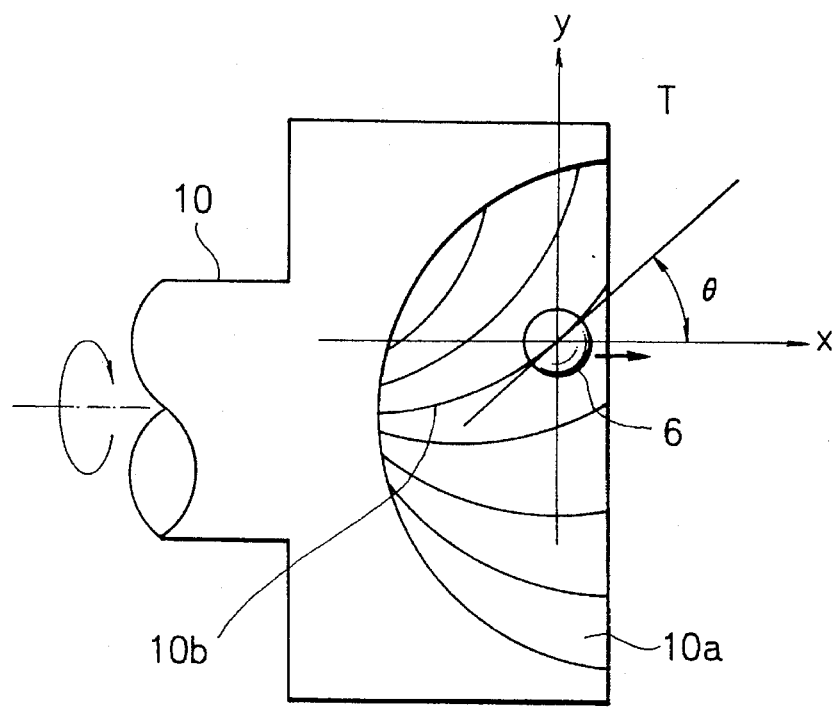
FIG. 10 is an explanatory drawing indicating the contact angle between ball groove and ball.
Figure 11:
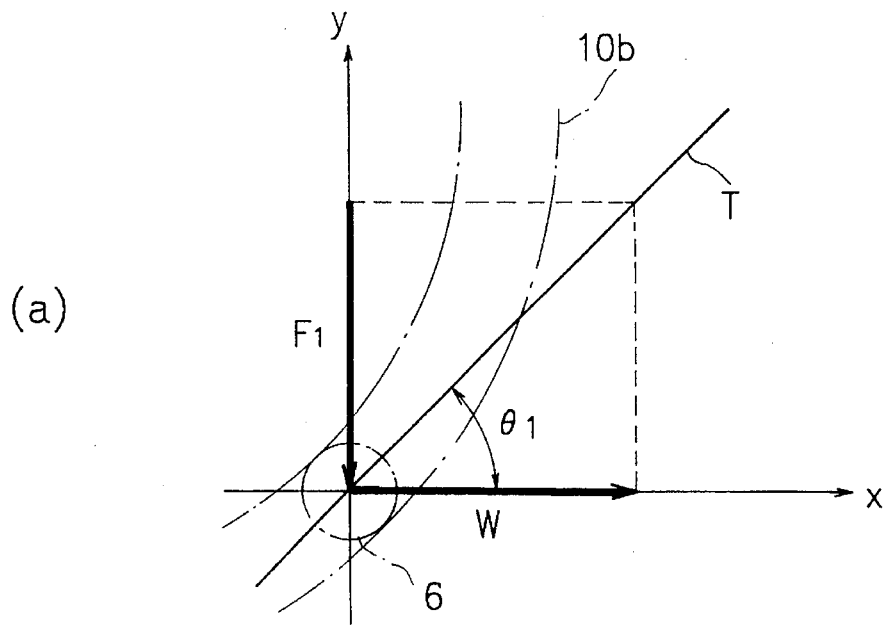
FIG. 11 is a comparative explanatory drawing of differential limitation effects with different contact angles.
Figure 11:
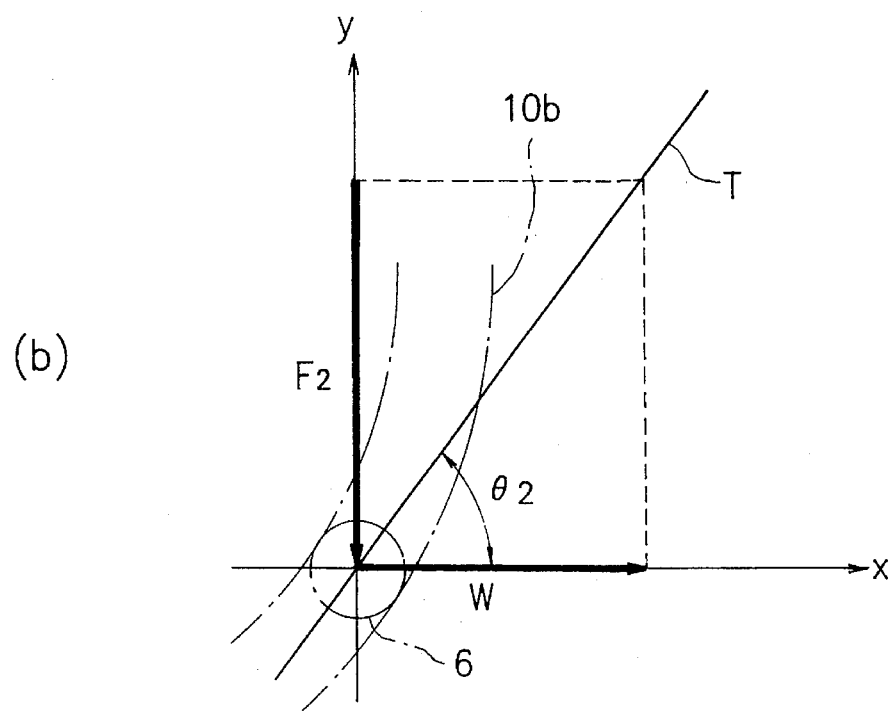

Also, each ball groove 10b is in contact with the ball 6 at a specified angle to the moving direction of the ball 6 (rotational direction of the ball ring 5). As this contact angle becomes larger, the differential limitation effect becomes larger. That is, supposing that the moving direction of the ball 6 is the X axis, the moving direction of the ball groove 10b is the Y axis and the tangent line between the curve being a center line of the ball groove 10b and the ball 6 being T as shown in FIG. 10, the angle between the x axis and the tangent line T becomes the contact angle θ between the ball 6 and the ball groove 10b. The magnitude of differential limitation effect is proportional to the magnitude of the reaction force given to the ball 6 from the ball groove 10b. That is, supposing that the load given to the output shaft 10 from the ball 6 is W (X-axis direction), the contact angle between the ball 6 and ball groove 10b is θ1 and the reaction force given to the ball 6 from the ball groove 10b is F1 (y-axis direction) as shown in FIG. 11(a).

$$F1=W.\tan\theta1$$

Supposing that the contact angle between the ball 6 and the ball groove 10b is θ2 (>θ1) as shown in FIG. 11(b), $$F2=W.\tan\theta2$$

From the above, F1<F2. It follows that as the contact angle θ becomes larger, the reaction force given to the ball 6 from the ball groove 10b, namely, the differential limitation effect, becomes larger. Accordingly, when the contact angle θ is set optionally to a desired value, a differential limitation effect suitable for use can be obtained.

Thus, the differential gear shown in this exemplary embodiment is of a very simple structure that fits balls 6 retained by the ball ring 5 with the ball grooves 10b of each output shaft and interconnects the differential rotation of each output shaft by the rotation of ball ring 5. This differential gear can be easily manufactured and requires a very small number of parts, being advantageous for increased productivity and reduced dimensions. The differential rotation of each output shaft 10 is limited by using the reaction force given to the balls 6 from the ball grooves 10b when the force to cause a rotational difference to each output shaft is given only from one output shaft 10. A differential gear with a differential limitation mechanism can be implemented without adding any special mechanism. Since the differential gear shown in this exemplary embodiment is a torque sensitizing type, stable operation can always be obtained unlike the rotation speed sensitizing type. When the angle between the ball groove 10b and the ball 6 is optionally set to a desired value, a differential limitation effect can be obtained in accordance with each usage. Thus, a merit of this differential gear is its excellent versatility.

In the operation in this exemplary embodiment, priority is given to rolling friction, and the moving speed and rolling speed of the balls 6 at differential rotations are very low. However, if a ball bearing or roller bearing is provided in the ball holes 5a of the ball ring 5, the friction resistance against the balls 6 can be further reduced.

Figure 12:
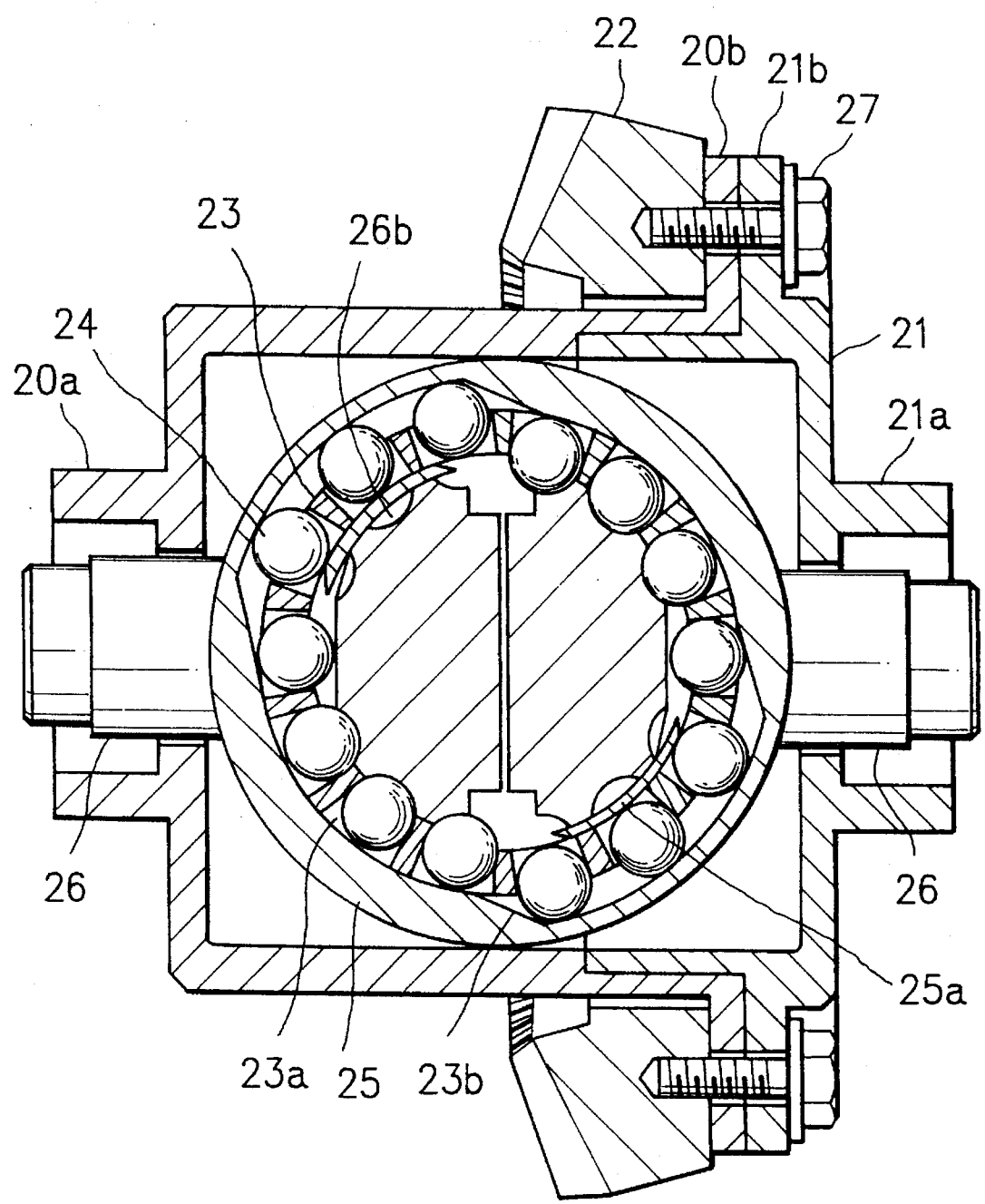
FIG. 12 is a side sectional view of the differential gear, indicating the second exemplary embodiment of this invention.
Figure 13:
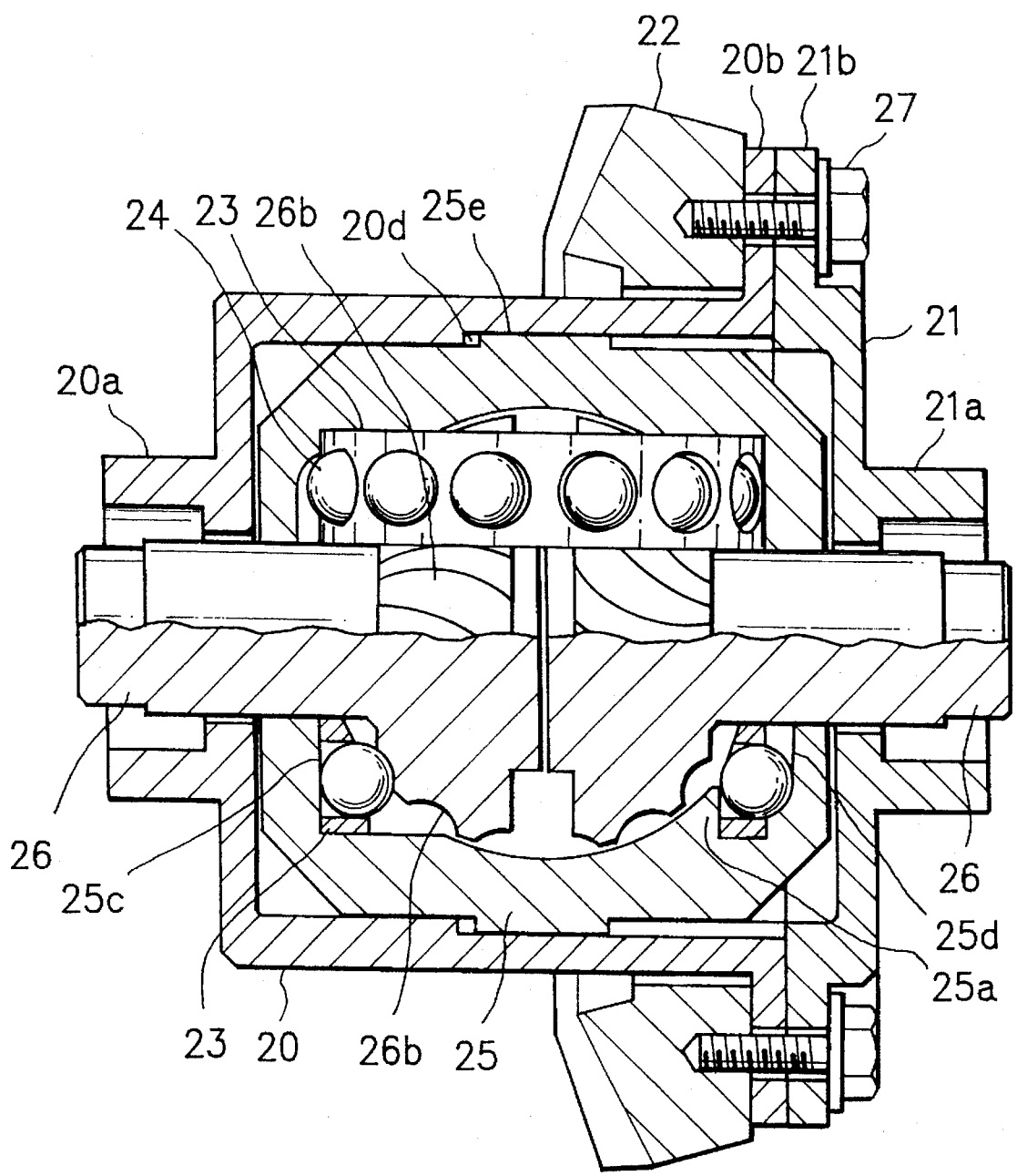
FIG. 13 is a plan sectional view of the differential gear.
Figure 14:
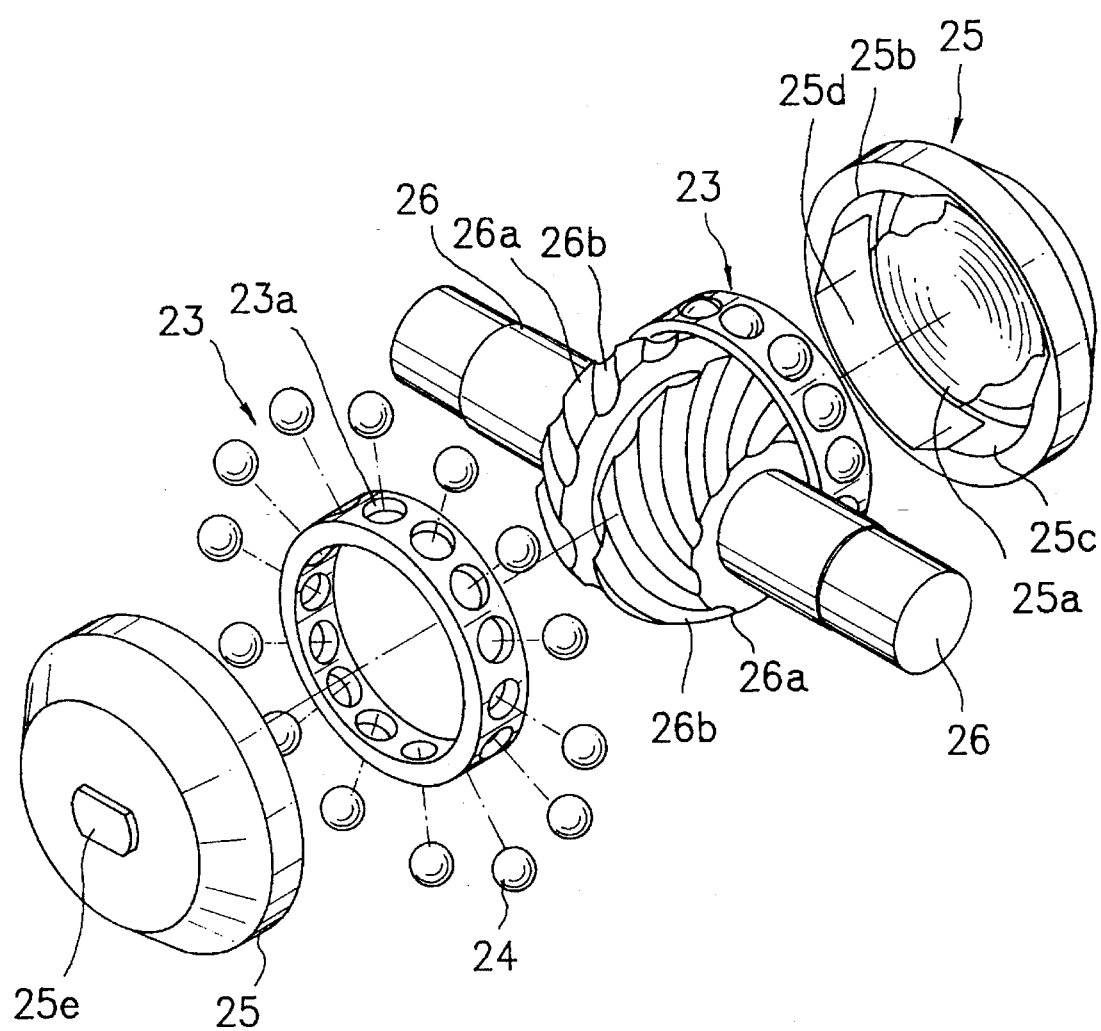
FIG. 14 is a partial exploded perspective view of the differential gear.
Figure 15:
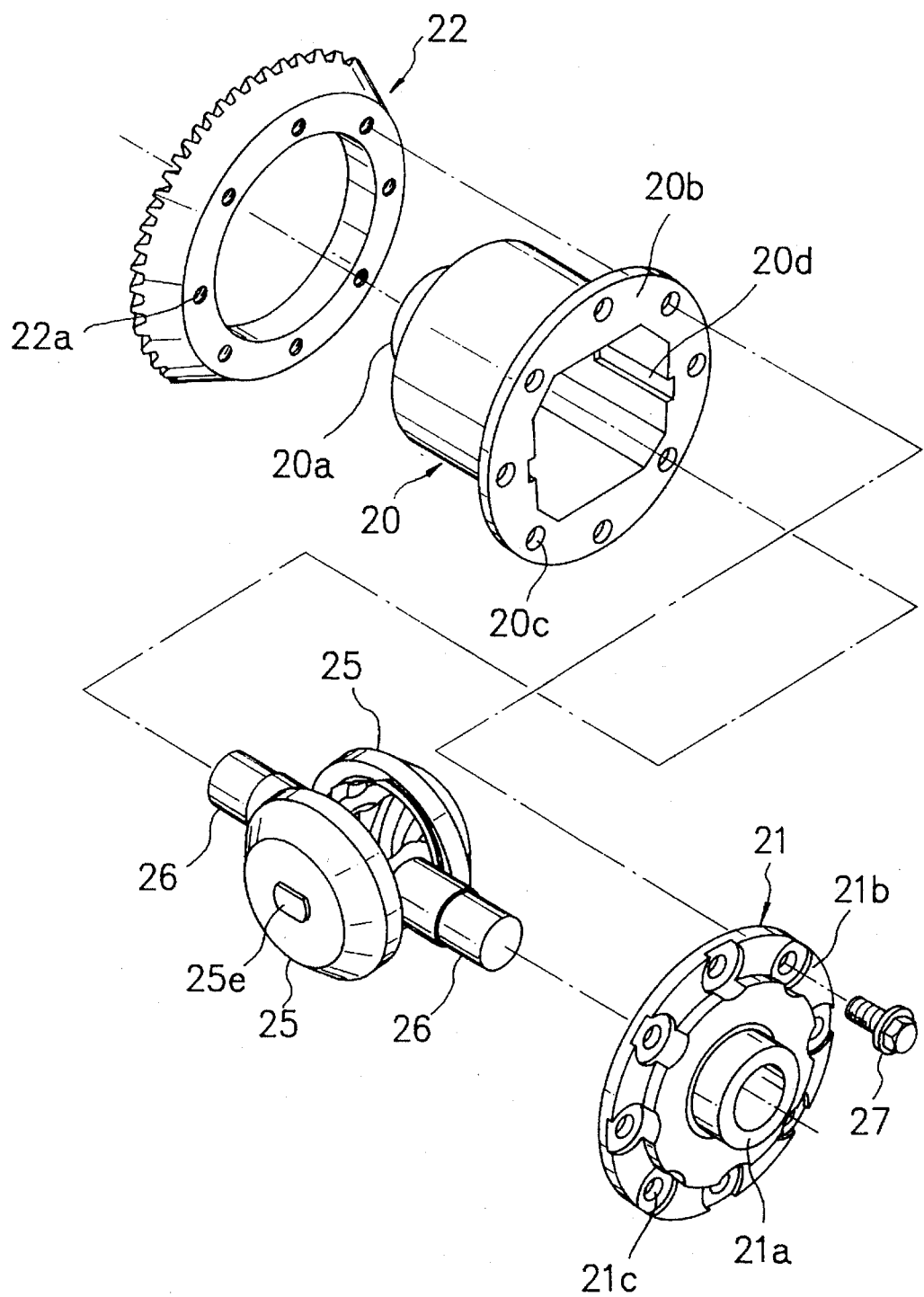
FIG. 15 is a partial exploded perspective view of the differential gear.

FIGS. 12 to 15 show the second exemplary embodiment of this invention. Though the ball ring is arranged inside the output-side rotary body in the first exemplary embodiment, the ball bearing is arranged outside the output-side rotary body in this exemplary embodiment. That is, FIG. 12 is a side sectional view of the differential gear. FIG. 13 is a plan sectional view of the same. FIGS. 14 and 15 are partially exploded perspective views of the same.

This differential gear consists of a gear case 20 being an input-side rotary body, a gear case cover 21 blocking one end of the gear case 20, a ring gear 22 provided on the outer circumference of the gear case 20, a pair of ball rings 23 opposite to the direction perpendicular to the shaft center of the gear case 20, numerous balls 24 retained by each ball ring 23 in freely-movable form, a ring holder 25 to retain each ball ring 23 in freely-rotatable form, a pair of ball rings 23 retained by the ring holder 25 in freely-rotatable form, and a pair of output shafts being output-side rotary bodies opposite to the direction of the shaft center of gear case 20.

The gear case 20 is composed of a cylindrical material with an opening at one end. At its other end, a bearing 20a passing through one output shaft 27 is provided. At the opening of the gear case 20, a flange 20b is formed and numerous holes 20c for bolt insertion are provided on the flange 20b. A receiving groove 20d to accept each ring holder 25 is provided on the inside of the gear case 20.

The gear case 21 is shaped in discoidal form. At its center, a bearing 21a passing through the other output shaft 10 is provided. A flange 21b is formed at the edge of the gear case cover 21. Numerous holes 21c for bolt insertion are provided on the flange 21b.

In the ring gear 22, one end face is formed by the gear, and numerous tapped holes 22a for bolt screwing are provided on the other end face. The internal diameter of the ring gear 22 is formed larger than the external diameter of the gear case 20.

Each of the ball rings 23 has numerous ball holes 23a to house the balls 24 and each ball hole 23a is arranged at equal intervals in a line in the circumferential direction of the ball rings 5.

Each ball 24 has a slightly smaller external diameter than the ball holes 23a of the ball rings 23 and is housed in each ball hole 5a in freely-rollable form.

Each ball ring 23 is interposed between individual ring holders 25. On the opposite surface, each ball ring 23 is retained in freely-rotatable form. On the inside of the ring holder 25, a circular-arc-shaped guard wall 25a in contact with the outside of the balls 24 retained by the ball rings 23 is formed. A total of two guard walls 25a are provided at intervals in the circumferential direction of the ring holder 25. On the inside of the ring holder 25, a ball guide 25b in contact with the outside of each ball 24 is provided. The inner circumference of the ball guide 25b consists of a total of two small-diameter section 25c, and a total of two large-diameter section 25d positioned between individual small-diameter sections 25c. Each small-diameter section 25c and each large-diameter section 25d are made in continuous form, and each large-diameter section 25d is provided at the position corresponding to the guard wall 25a. In the middle of the outside of each ring holder 25, an approximately square-shaped boss 25e fitted to the receiving groove 20d of the gear case 20 is provided.

Each output shaft 26 extends toward the shaft center of the gear case 1. At one of its ends, a spherical section 26a with convex shape is provided. In the spherical section 26a, numerous ball grooves 26b fitted with the balls 24 are formed and each ball groove 26b describes a curve with a specified curvature curved in the same direction. In this case, the output shafts 26 themselves are the same shape, but after assembly, are arranged in the opposite direction to each other, so that the ball groove 26b of each output shaft 26 is curved in the opposite direction to their shaft centers.

In the above construction, as shown in FIG. 14, each ball ring 23 housing each ball 26 is arranged outside the spherical section 26a of each output shaft 26 is arranged and each ball ring 23 is covered with each ring holder 25. At this time, the inner circumference of the ball guide 25 is brought into contact with the outer circumference of each ball 24. The position of each ball 6 to the direction of the diameter of the ball ring 23 is controlled by the small-diameter section 25c and the large-diameter section 25d of the ball guide 25b. That is, the ball 24 positioned at the large-diameter section 25d of the ball guide 25b is positioned at an outer side rather than the inner circumferential surface of the ball ring 23 which is covered with the guard wall 25a of the ring holder 25, so that the ball 24 does not protrude inside the ball ring 23. The ball 24 positioned at the small-diameter section 25c of the ball guide 25b is deflected inside the ball ring 23 by the small-diameter 25c and a part of it protrudes inside the ball ring 23. Consequently, the balls 24 protruding inside the ball ring 23 are fitted to the ball grooves 26b of each output shaft.

The assembly formed in this way is housed in the gear case 20 as shown in FIG. 15. That is, one output shaft 26 is inserted into the bearing 20a of the gear case 20 and the boss 25e of each ring holder is fitted to the receiving groove 20d of the gear case 20. In this condition, the gear case cover 21 is installed on the gear case 20 and the other output shaft 26 is inserted into the bearing 21a of the gear case cover 21. Also, the ring gear 22 is installed on the flanges 20b and 21b of the gear case 20 and gear case cover 21 with a bolt 27. That is, the bolt 27 is inserted into the hole 21c of the flange 21b, passes through the hole 20c of the flange 20b, and is screwed into the tapped hole 22a of the ring gear 22.

In the above construction, when the gear case 20 is rotated around the shaft center by the externally-input driving force, each ball ring 23 rotates around the shaft center of the gear case 20 and this rotating force is transmitted to the spherical section 26a of each output shaft 26 through the balls 24 fitted to the ball grooves 26b of each output shaft 26. In this case, if a rotational difference occurs on each output shaft, the ball grooves 26b of each output shaft 26 roll the balls 24 and the ball rings 23 rotate in the opposite direction to each other around the shaft perpendicular to the shaft center of the gear case 20 following the rotation of the balls 24. This allows the differential rotation of each output shaft 26 to be attained. At this time, if the force required to cause a rotational difference to each output shaft 26 is given only from one output shaft 26, the balls 24 on the other output shaft 26 cause the ball grooves 26b, being a driving side, to follow their own motion. As a result, the balls 24 receive reaction force from the ball grooves 26b and this acts as a resistance to limit the differential rotation of each output shaft. In this case, the magnitude of reaction force given to the balls 24 from the ball grooves 26b, namely, the magnitude of differential limitation effect can be optionally set to a desired value, as described in the foregoing exemplary embodiment, by changing the contact angle value between the balls 24 and ball grooves 26b. In the case of this exemplary embodiment, a thrust load is provided in the direction that brings the spherical section 26a of each output shaft close to the other and the end faces of individual output shafts 26 are brought into contact by pressure, causing sliding friction. A differential limitation effect can also be obtained by this friction resistance. In this case, a material equivalent to the thrust washer shown in the first exemplary embodiment may be interposed between the end faces of individual output shafts 26.

Figure 16:
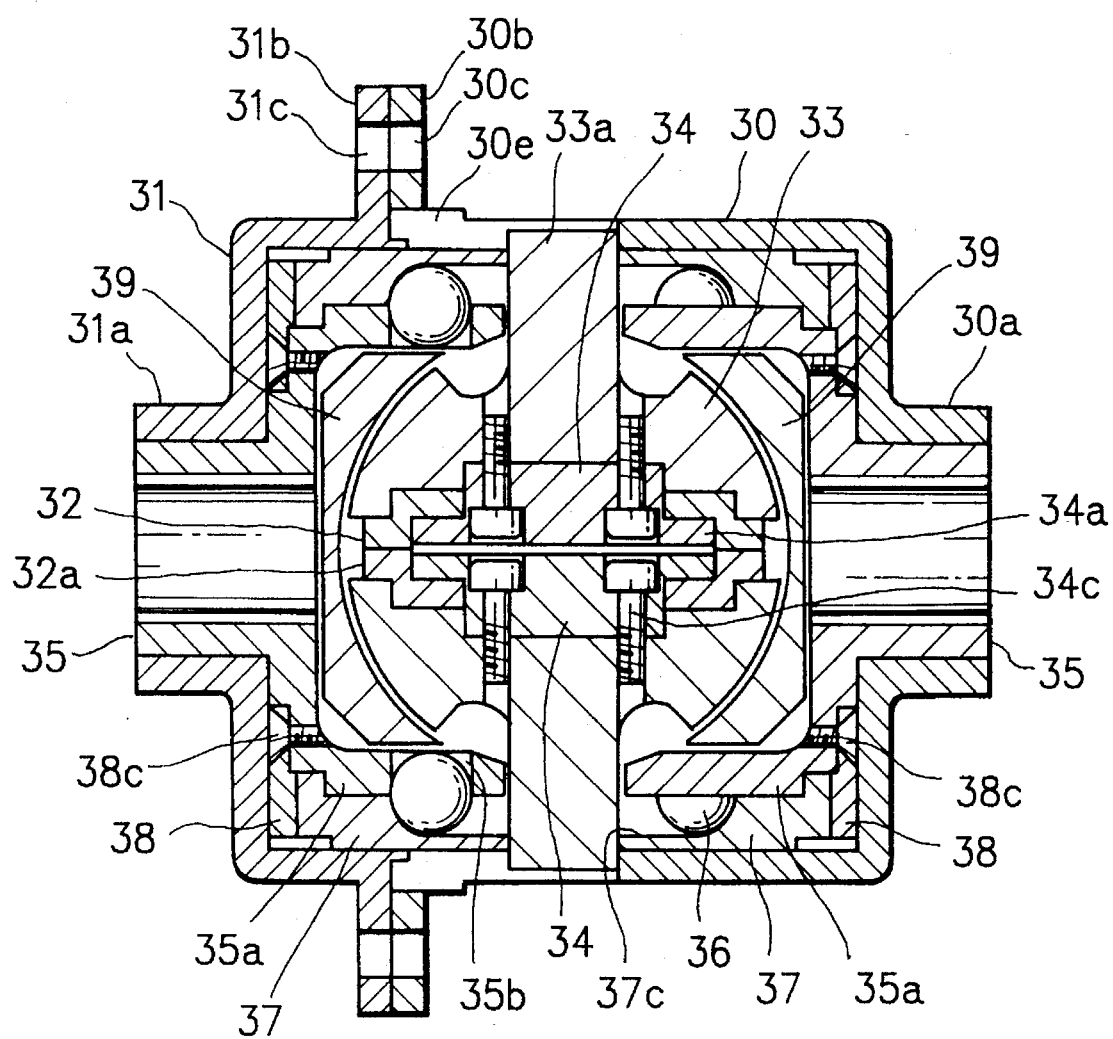
FIG. 16 is a plan sectional view of the differential gear, indicating the third exemplary embodiment of this invention.
Figure 17:
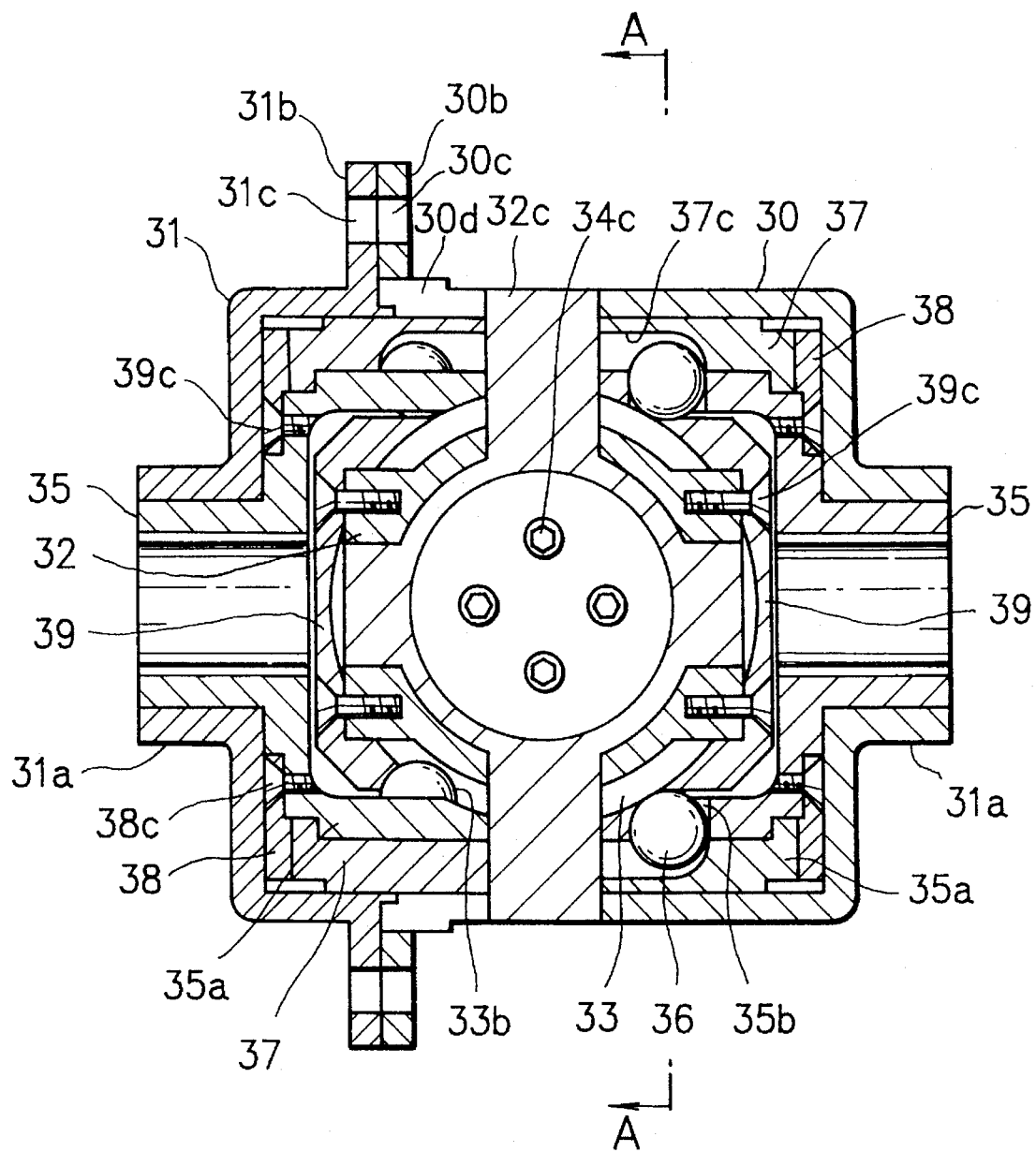
FIG. 17 is a side sectional view of the differential gear.
Figure 18:
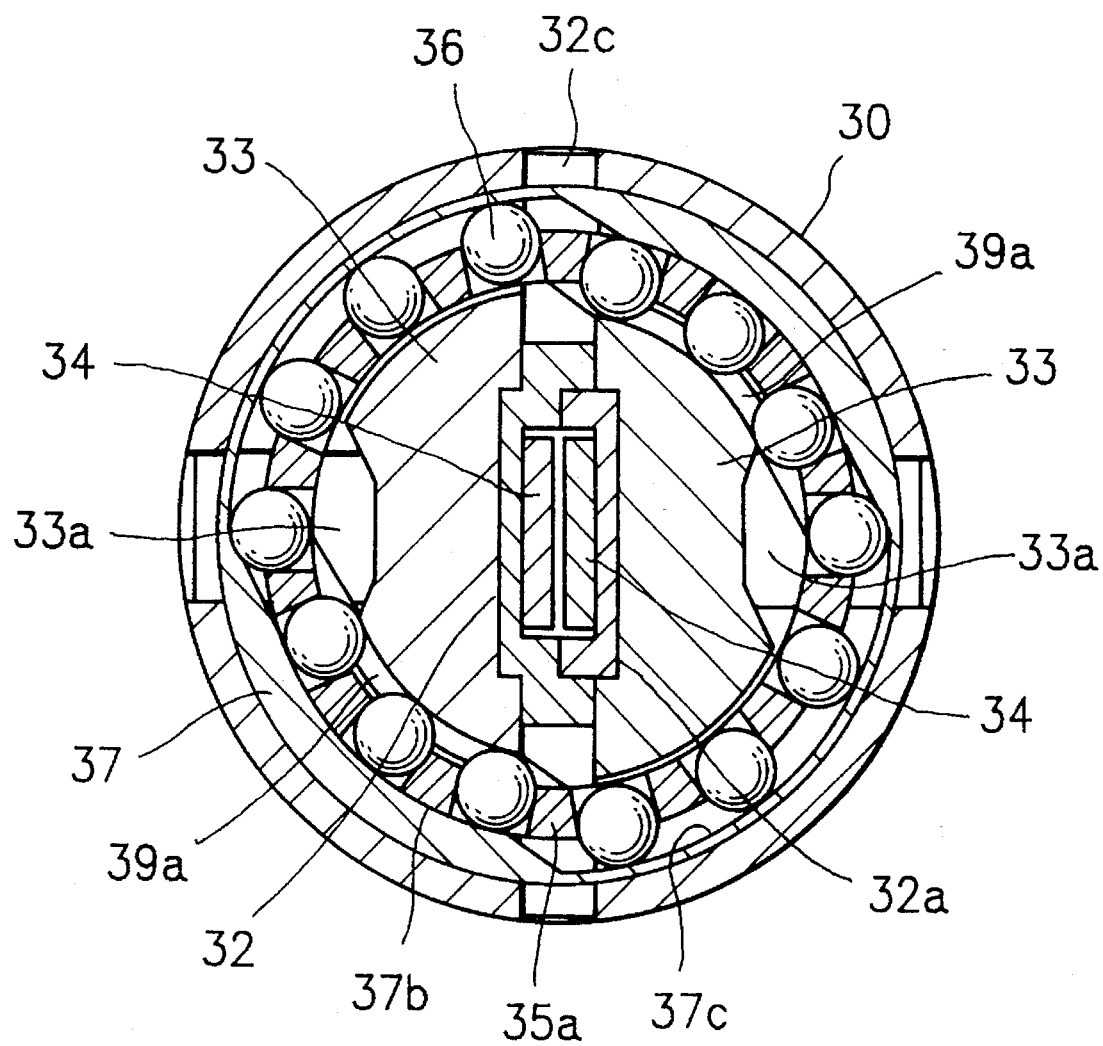
FIG. 18 is a sectional view along the arrow in the direction A—A of FIG. 17.
Figure 19:
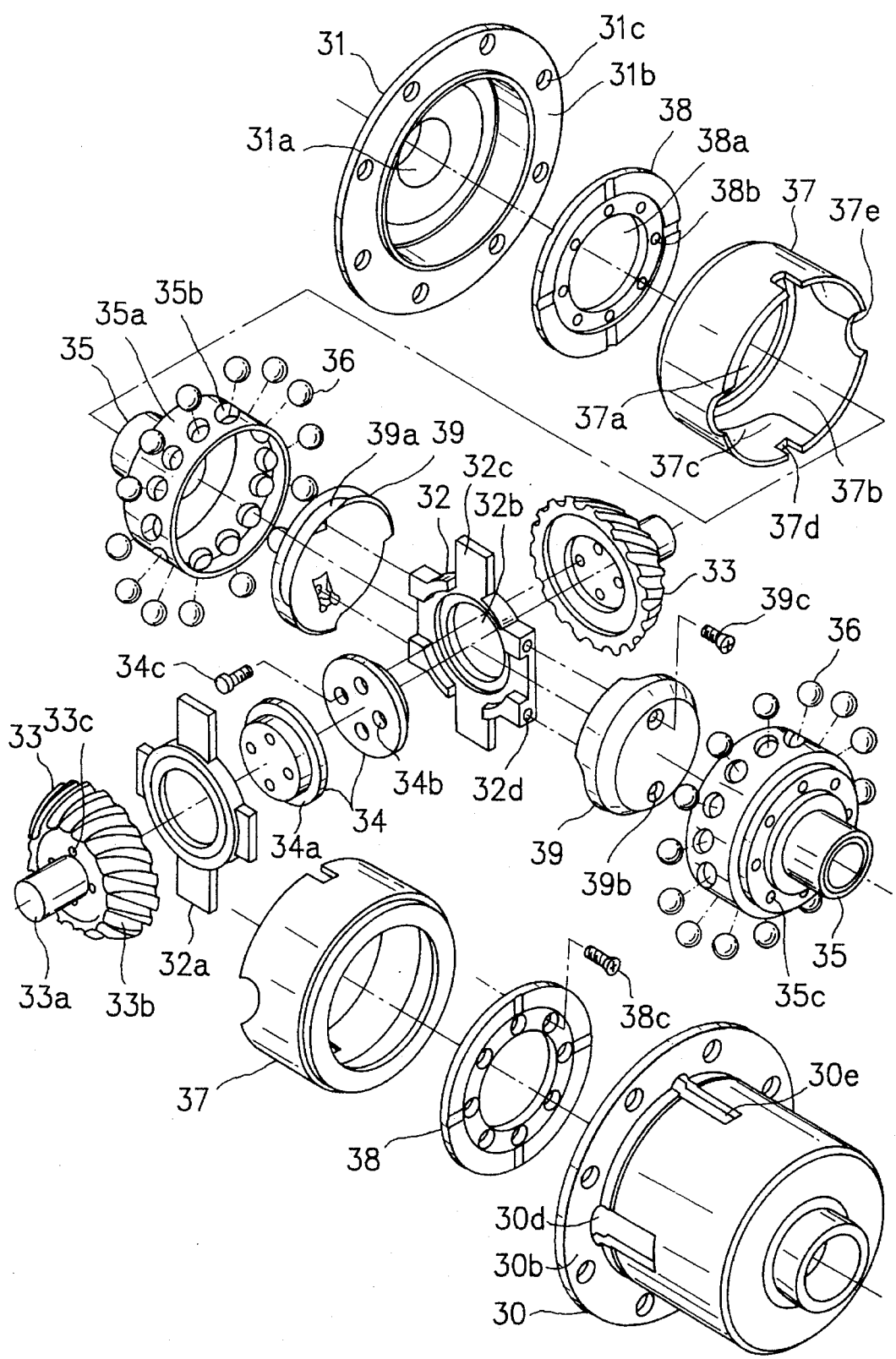
FIG. 19 is an exploded perspective view of the differential gear.

FIGS. 16 to 19 show the third exemplary embodiment of this invention. FIG. 16 is a plan sectional view of the differential gear. FIG. 17 is a side sectional view of the same. FIG. 18 is a sectional view along the arrow in the direction A—A of FIG. 17. FIG. 19 is an exploded perspective view of the differential gear.

This differential gear consists of a gear case 30 being an input-side rotary body, a gear case cover 31 blocking one end of the gear case 30, a centerplate 32 fixed in the middle of the gear case 30, a pair of spherical bodies 33 opposite to the direction perpendicular to the shaft center of the gear case 30 interposed between the centerplate 32, a total of two fixing plates 34 to retain each spherical body at the centerplate 32 in freely-rotatable form, a pair of output shafts 35 being output-side rotary bodies opposite to the direction of the shaft center of the gear case 30 interposed between each spherical body 33, numerous balls 36 retained by the ring section 35a of each output shaft 35, a pair of ring holders 37 to retain each ring section 35a in freely-rotatable form, a total of two fixing plates 38 to install each ring section 35a on each ring holder 37, and a pair of ball guides 39 arranged inside each ring section 35a.

The gear case 30 is composed of a cylindrical material with an opening at one end. At its other end, a bearing 30a passing through a part of one ball ring 35 is provided. At the opening of the gear case 30, a flange 30b is formed and numerous holes 30c for bolt insertion are provided on the flange 30. On the side face of the gear case 30, a receiving groove 30d to hold the centerplate 32 and a receiving groove 30e to hold each spherical body 33 are provided.

The gearing case 31 is shaped in discoidal form. At its center, a bearing 31a passing through a part of the other ball bearing 35 is provided. A flange 31b is formed at the edge of the gear case cover 31. Numerous holes 31c for bolt insertion are provided on the flange 31b.

The centerplate 32 has a split section 32a, a part of which is split on one spherical body 33 side. At its center, a hole 32b is provided to which a part of the fixing plate 34 is fitted. A boss 32c to be fitted to the receiving groove 30e of the gear case 30 and a tapped hole 32d to fix each ball guide 39 are provided on the centerplate 32.

Each spherical body 33 has a shaft 33a extending toward the direction perpendicular to the shaft center of the gear case 30 and one of its sides is convex-shaped. Numerous ball grooves 33b fitted to individual balls 36 are formed on each spherical body 33 and each ball groove 33b describes a curve with a specified curvature curved ill the same direction. In this case, the spherical bodies 33 themselves are the same shape, but after assembly, are arranged in the opposite direction to each other, so that the ball groove 33b of each spherical body 33 is curved in the opposite direction to the shaft center of each spherical body 33. On the opposite surface side of each spherical body 33, multiple tapped holes 33c to clamp each fixing plate 34 are provided.

Each fixing plate 34 is shaped in discoidal form and a flange 34a is provided on its circumferential surface. A hole 34 for bolt insertion is provided on each fixing plate 34. When the bolt 34c passed through this hole 34b is screwed into the tapped hole 33c of the spherical body 33, one spherical body 33 and one fixing plate 34 are clamped through the hole 32b of the centerplate 32. The other spherical body 33 and the other fixing plate 34 are clamped through the hole 32b of the split section 32a of the centerplate 32. Consequently, the flange 34a of each fixing plate is retained on the edge of the hole 32b and each spherical body 33 is retained by the centerplate 32 and split section 32 in freely-rotatable form. The centerplate 32 and split section 32a are joined in the condition where each spherical body 33 is retained and the end faces of individual fixing plates 34 arranged inside it are opposite to each other.

Each output shaft 35 extends toward the the shaft center of the gear case 30. At one of its ends, a cylindrically-expanded ring section 35a is provided. Numerous ball holes 35b to house each ball 36 are provided on the ring section 35a and each ball hole 35b is arranged at equal intervals in the circumferential direction of the ring section 35a. On the rear side of the ring section 35a, multiple tapped holes 35c to clamp each fixing plate 38 are provided.

Each ball 36 has a slightly smaller external diameter than the ball hole 35b of the ring section 35a and is housed in each hole 35b in freely-rotatable form.

Each ring holder 37 is shaped in cylindrical form. At the middle of one of its ends, a hole 37a is provided to which a part of the ring section 35a is fitted. On the inside of each ring holder 37, a small-diameter ball guide section 37b and a large-diameter ball guide section 37c in contact with the outside of each ball 36 are provided and two individual ball guide sections 37b and 37c each are continuously formed alternately in the circumferential direction. On the edge of the opening of each ring holder 37, a receiving groove 37d to hold the boss 32c of the centerplate 32 and a receiving groove 37e to put the shaft 33a of each spherical body 33 are provided respectively.

Each fixing plate 38 is shaped in discoidal form. At its center, a hole 38b to insert the output shaft 35 is provided. Multiple holes 38b for screw insertion are provided on each fixing plate 38. When the screw 38c passing through this hole 38b is screwed into the tapped hole 35c of the ring section 35a, each ring section 35a and fixing plate 38 are clamped through the bole 37a of the ring holder 37. Consequently, the fixing plate 38 is retained on the edge of the hole 37a of the ring holder 37 and the ring section 35a is retained in the ring holder 37 in freely-rotatable form.

The ball guides 39 are opposite to each other interposed between each spherical body 33 and cover a part of the outer circumferential surface of each spherical body 33. A total of two notches 38a are provided at intervals in the circumferential direction on the edge of each ball guide 39 and each notch 39a is formed at the position corresponding to the small-diameter ball guide section 37b of the ring holder 37. Multiple holes 39b for screw insertion are provided on each ball guide 39. When the screw 39c passed through this hole 39b is screwed into the tapped hole 32d of the centerplate 32, each ball guide 39 is clamped to the centerplate 32.

In the above construction, when the gear case 30 rotates around the shaft center by the externally-input driving force, each spherical body 33 rotates around the shaft center of the gear case 30 and this rotating force is transmitted to the ring section 35a of each output shaft 35 through the balls 36 fitted to the ball grooves 33b of each spherical body 33. In this case, if a rotational difference occurs on each output shaft, each ball 36 retained by each ring section 35a rolls in the ball groove 33b of each spherical body 33 and each spherical body 33 rotates in the opposite direction to each other around the shaft perpendicular to the shaft center of the gear case 30 following the roll of each ball 36. With this, a differential rotation of each output shaft 35 can be attained. At this time, when the force to cause a rotational difference to each output shaft 35 is given only from one output shaft 35, the ball grooves 33b being a driven side at differential rotation cause the balls 36 being a driving side to follow their own motion on the other shaft 35, so that reaction force is given to these ball grooves 33b from the balls 36, which works as a resistance to limit the differential rotation of each output shaft. In this case, the magnitude of reaction force given to the ball grooves 33b from the balls 36, namely, the magnitude of the differential limitation effect can be optionally set to a desired value by changing the contact angle value between the balls 36 and the ball grooves 33b as shown in the foregoing exemplary embodiment. In this exemplary embodiment like the second exemplary embodiment, a thrust load is provided in the direction that brings each spherical body 33 close to the other and the end faces of individual fixing plates 34 interposed between individual spherical bodies 33 are brought into contact by pressure, thereby causing sliding friction. A differential limitation effect can also be obtained by this friction resistance. In this case, a material equivalent to the thrust washer shown in the first exemplary embodiment may be interposed between the end faces of individual fixing plates 34.

Figure 20:
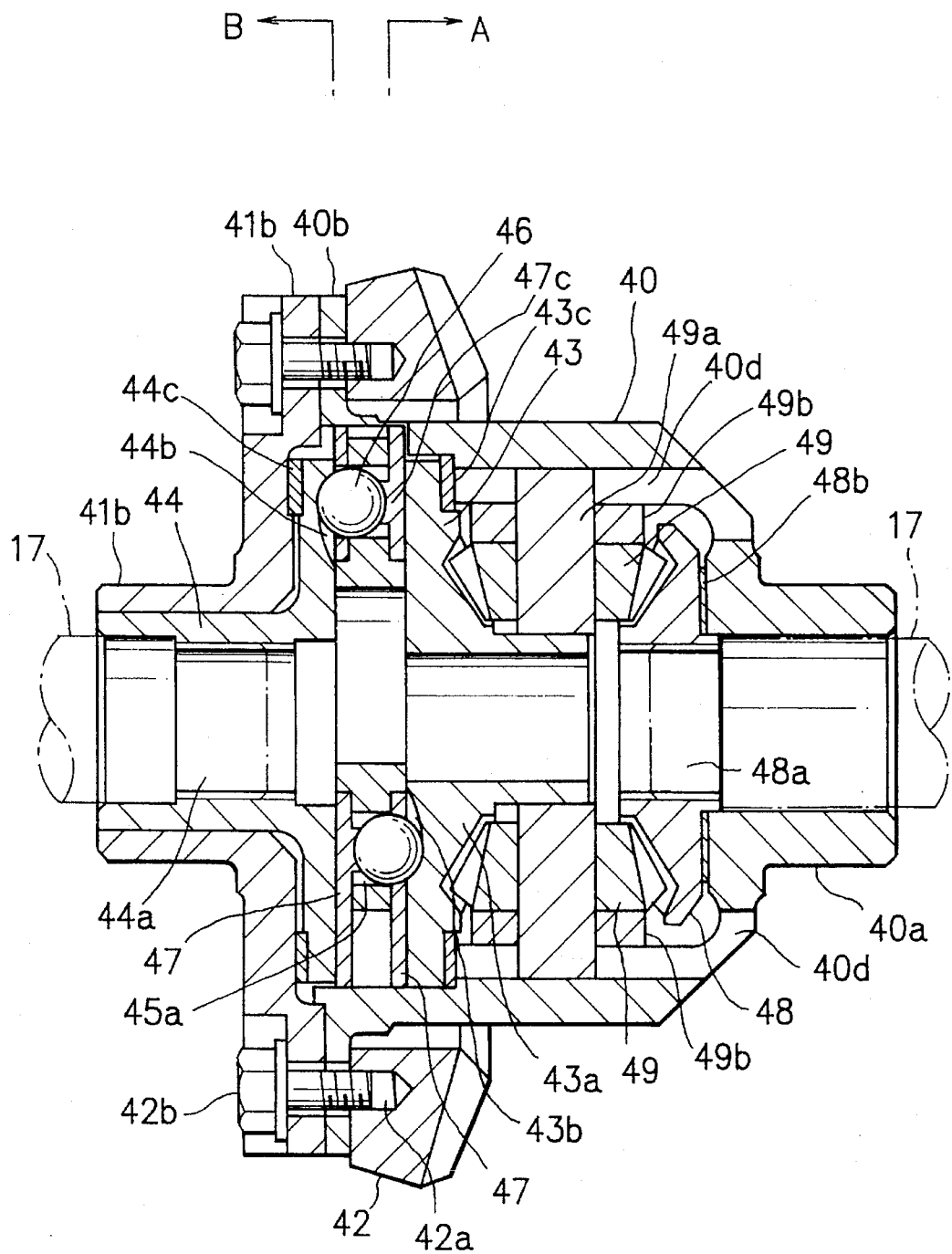
FIG. 20 is a side sectional view of the differential gear, indicating the fourth exemplary embodiment of this invention.
Figure 21:
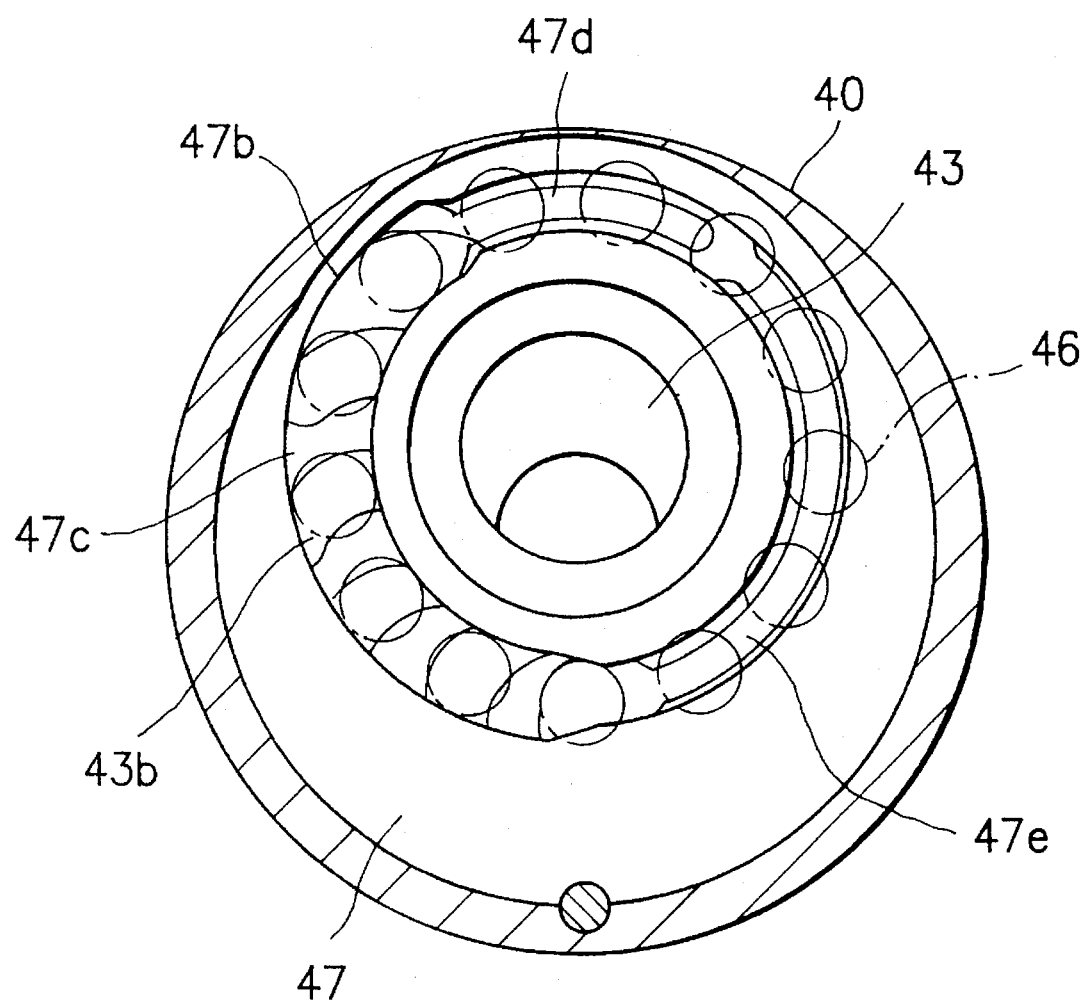
FIG. 21 is a sectional view along the arrow in the direction A—A of FIG. 20.
Figure 22:
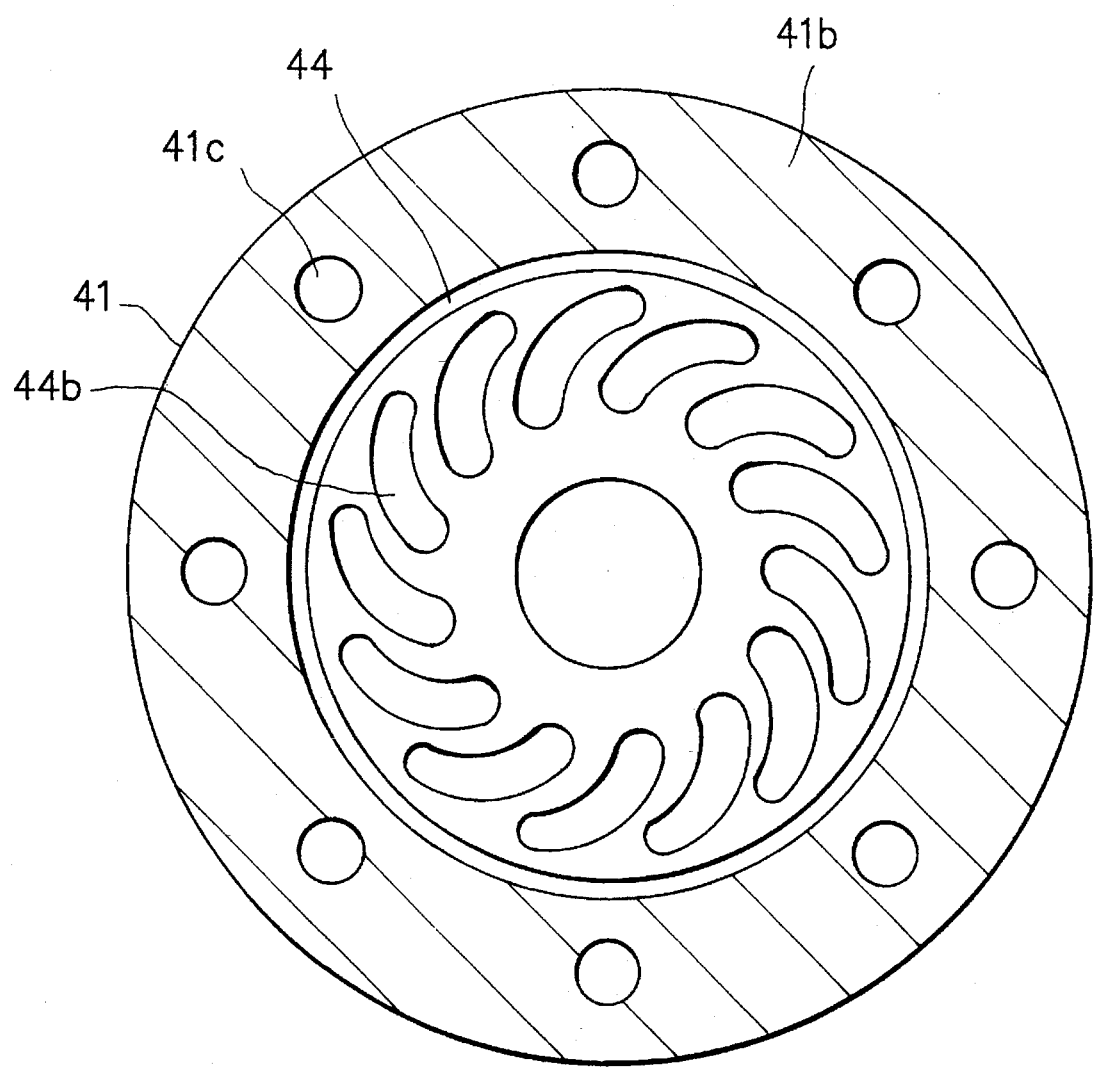
FIG. 22 is a sectional view along the arrow in the direction B—B of FIG. 20.
Figure 23:
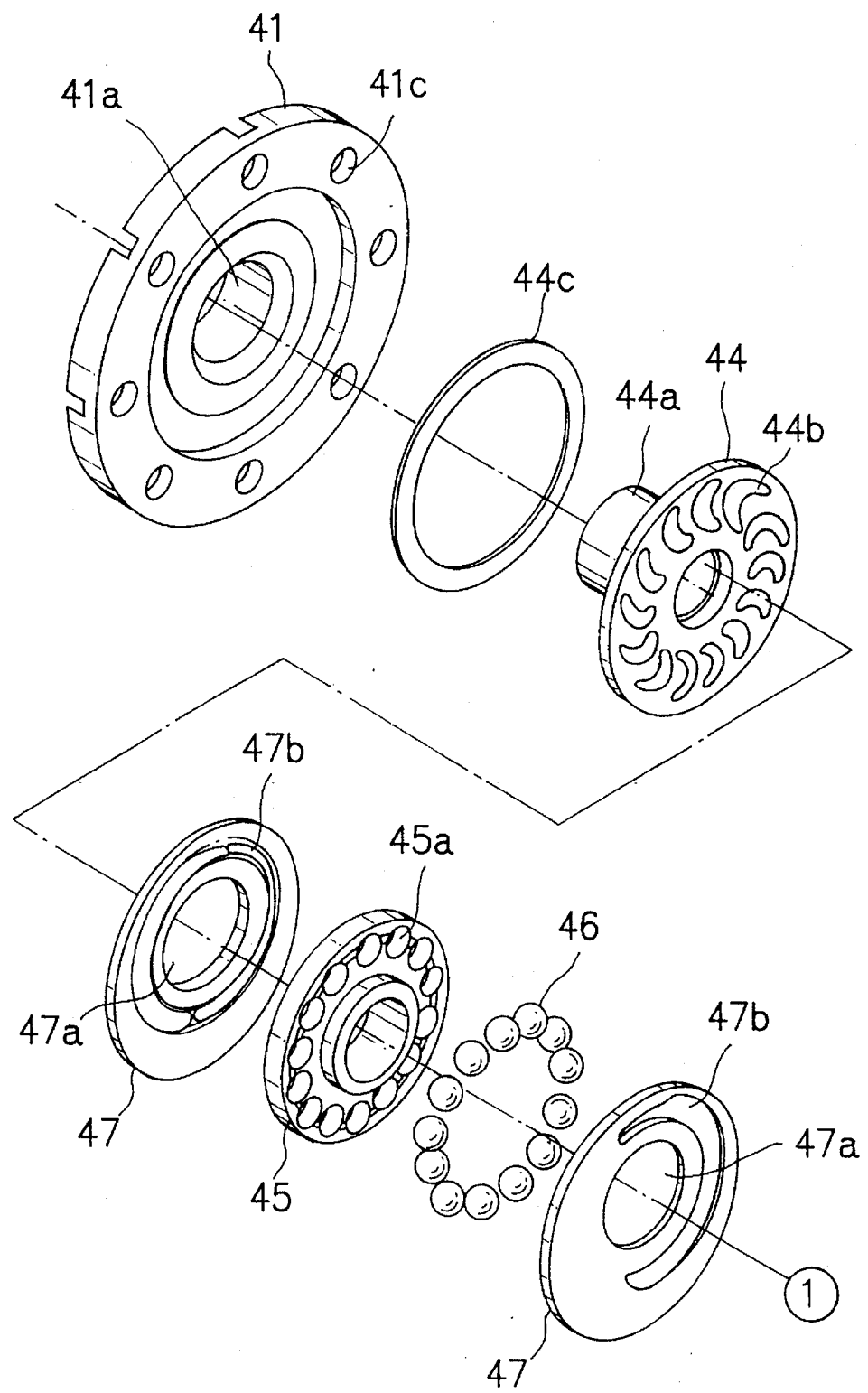
FIG. 23 is an exploded perspective view of the differential gear.
Figure 24:
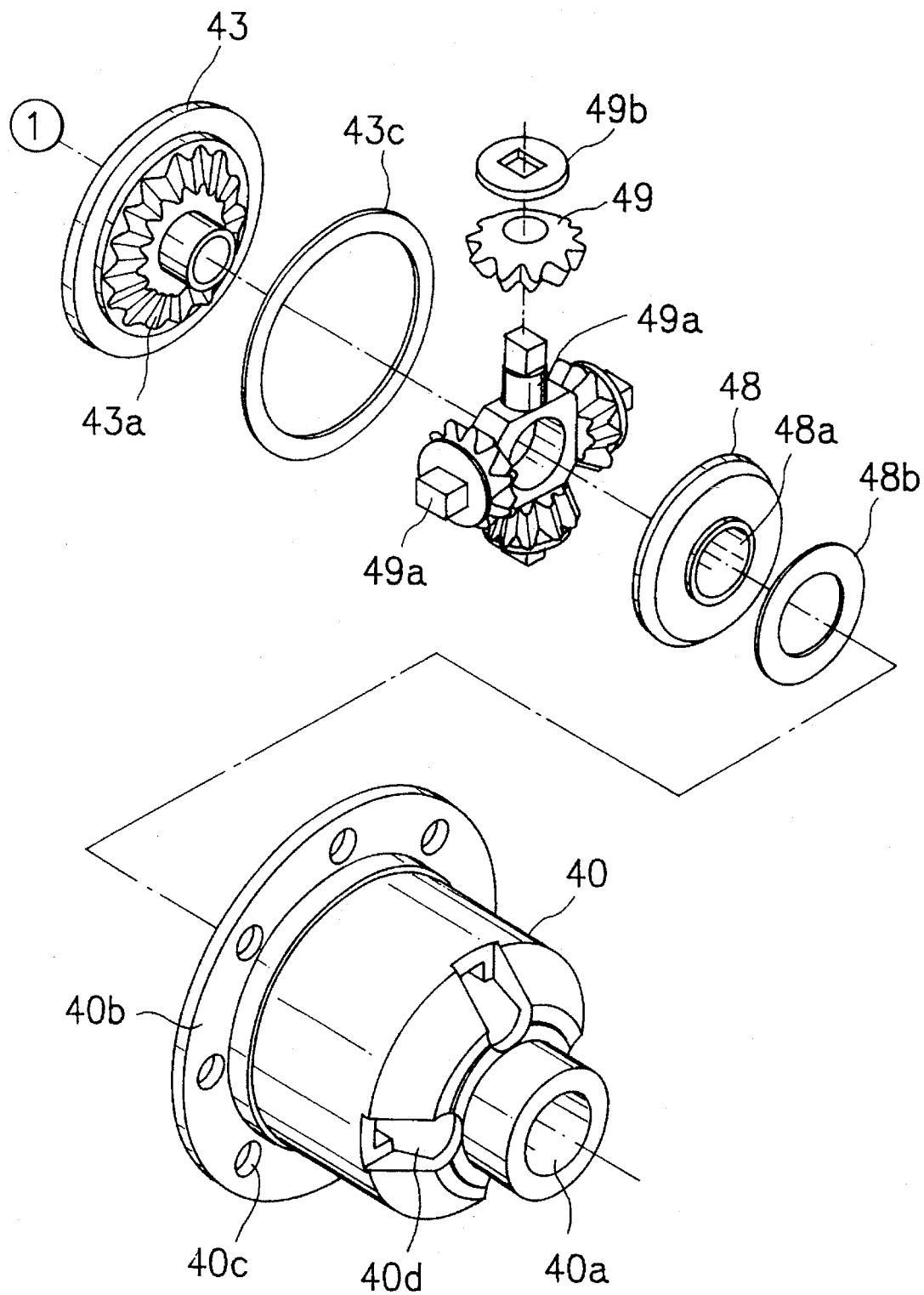
FIG. 24 is an exploded perspective view of the differential gear.

FIGS. 20 to 28 show the fourth exemplary embodiment of this invention. FIG. 20 is a side sectional view of the differential limiting device. FIG. 21 is a sectional view along the arrow in the direction A—A of FIG. 20. FIG. 22 is a sectional view along the arrow in the direction B—B of FIG. 20. FIGS. 23 and 24 are exploded perspective views of the differential limiting device. The chain line in FIGS. 23 and 24 denotes the continuation of the same number corresponding to each figure.

This differential limiting device consists of a gear case 40 being an input-side rotary body, a gear case cover 41 blocking one end of the gear case 40, a ring gear 42 installed on the outer circumference of the gear case 40, a pair of output disks 43 and 44 being output-side rotary bodies arranged opposite to each other on the shaft center of the gear case 40, an eccentric disk 45 arranged on the eccentric shaft against the shaft center of the gear case 40, numerous balls 46 retained by the eccentric disk 45 in freely-movable form, a pair of disk holders 47 to retain the eccentric disk 45 in freely-rotatable form, a bevel gear 43a provided in the form united with one output disk 43, a bevel gear 48 arranged on the shaft center of the gear case 40 opposite to the bevel gear 43a, and four pinion gears interposed between the bevel gears 43a and 48.

The gear case 40 is composed of a cylindrical material with an opening at one end. At its other end, a bearing 40a to retain the bevel gear 48 is provided. At the opening of the gear case 40, a flange 40b is formed and numerous holes 40c for bolt insertion are provided on the flange 40b. On the inside of the gear case 40, a receiving groove 40d to retain the pinion gears 49 is provided.

The gear case cover 41 is shaped in discoidal form. At its center, a bearing 41a to retain a part of the output disk 44 is provided. On the edge of the gear case cover 41, a flange 41b is formed and numerous holes 41c for bolt insertion are provided on the flange 41b.

In the ring gear 42, one end face is formed by the gear and its internal diameter is formed slightly larger than the external diameter of the gear case 40. On the other end face of the ring gear 42, a tapped hole 42a is provided. When the boll 42b passing through the boles 40c and 41c of the gear case 40 and gear case cover 41 is screwed into the tapped hole 42a of the ring gear 42, the gear case 40, gear case cover 41 and ring gear 42 are joined into one unit.

In one output disk 43, one end face is opposite to the eccentric disk 45 and the bevel gear 43a is provided in joined form on the opposite side. On one end face of the output disk 43, numerous ball grooves 43b fitted to individual balls 46 are formed and each ball groove 43b describes a curve with a specified curvature curved in the same direction. Between the edge of the output disk 4 and the level difference in the gear case 40, a thrust washer 43c is interposed.

In the other output disk 44, one end face is opposite to the eccentric disk 45 and a connecting section 44a to connect one of the foregoing driving shafts 17 is provided on the opposite side. On one end face of the output disk 44, numerous ball grooves 44b fitted to individual balls 46 are formed and each ball groove describes a curve with a specified curvature curved in the same direction as on output disk 43. In this case, the opposite surfaces of the output disks 43 and 44 are of the same shape, and after assembly, they are arranged in the opposite direction to each other, so that the ball grooves 43b and 44b of individual output disks 43 and 44 are curved in the opposite direction to each other against the shaft centers of the output disks 43 and 44. Between the rear side of the output disk 44 and the gear case cover 41, a thrust washer 44c is interposed.

Both end faces of the eccentric disk 45 are opposite to the output disks 43 and 44 respectively and arranged on the shaft offset at a specified distance from the shaft centers of the output disks 43 and 44.

Numerous ball holes 45a to house each ball 46 are provided on the eccentric disk 45 in through-form and each ball hole 45a is arranged at equal intervals in a line in the circumferential direction. The center of both end faces of the eccentric disk protrudes a little toward the shaft center.

Each ball 46 has a slightly smaller external diameter than the ball hole 45a of the eccentric disk 45 and is housed in each ball hole 45a in freely-rotatable form.

Each disk holder 47 is shaped in discoidal form and fixed in each gear case 40. On each disk holder 47, a hole 47a is provided at the position offset by a specified distance from the center. When the center of both end faces of the eccentric disk is inserted into this hole 47a, the eccentric disk 45 can be retained in freely-rotatable form in the eccentric status. On each disk holder 47, a ball guide 47b is extended in circumferential form along each ball hole 45a of the eccentric disk 45, and this ball guide 47b consists of the first guide section 47c through which the ball 46 can be passed, the second guide section 47d to retain the ball 46 at the neutral position, and the third guide section 47e to offset the ball 46 in the direction of the shaft center of the eccentric disk 45. The first guide section 47c is formed in an approximate half-range in the circumferential direction. The first guide section 47c of one disk holder 47 is provided at the position corresponding to the second guide section 47d and the third guide section 47e of the other disk holder 47. That is, on one end face of the eccentric disk 45, the ball 46 positioned at the third guide section 47e of one disk holder 47 protrudes to one output disk 43 side through the first guide section 47c of the other disk holder 47 and is fitted to the ball groove 43b of the output disk 43. On the other end face of the eccentric disk 45, the ball 46 positioned at the third guide section 47e of the other disk holder 47 protrudes to the other output disk 44 through the first guide section 47c of one disk holder 47 and is fitted to the ball groove 44b of the output disk 44.

The bevel gear 48 has a connecting section 48a to connect the other side of the foregoing driving shafts 17 and is retained by the bearing 40a of the gear case 40 in rotatable form. Between the rear side of the bevel gear 48 and the gear case 40, a washer 48b is interposed.

Each pinion gear 49 is retained in freely-rotatable form by a total of four support shafts 49a intersecting the shaft center of the gear case 40 at a right angle and transmits the rotating force of each bevel gear 43a or 48 alternately. Each support shaft 49a is set into the receiving groove 40d of the gear case 40 through a washer 49b and fixed in the gear case 40. In this case, when each pinion gear 49 rotates by itself, the rotation of one output disk 43 is converted into the reverse direction. That is, a differential limiting mechanism is constituted by individual bevel gears 43a and 48 and individual pinion gears 49.

Figure 25:
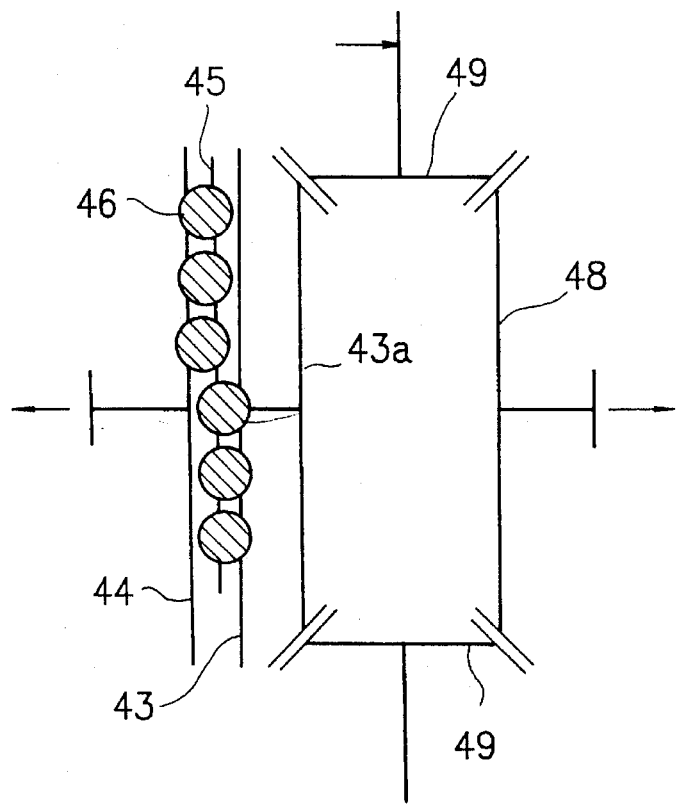
FIG. 25 is a general block diagram of the differential gear.
Figure 26:
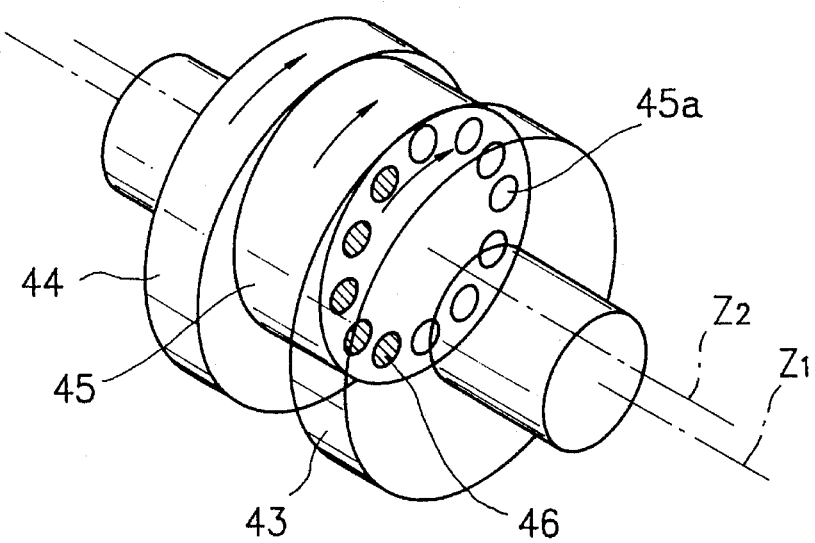
FIG. 26 is an operational explanatory drawing of the output disk and eccentric disk.
Figure 27:
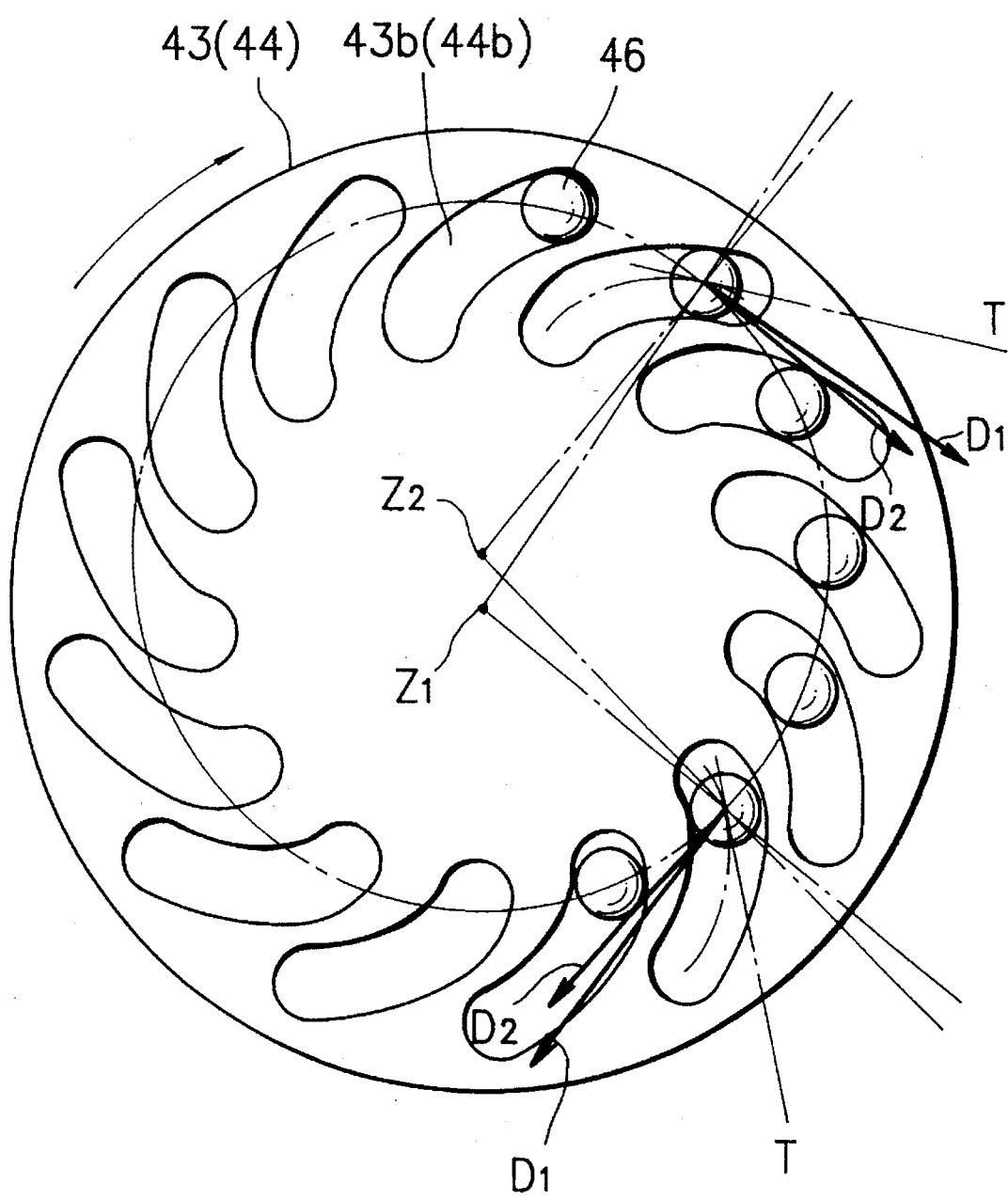
FIG. 27 is an operational explanatory drawing of the balls and ball grooves.
Figure 28:
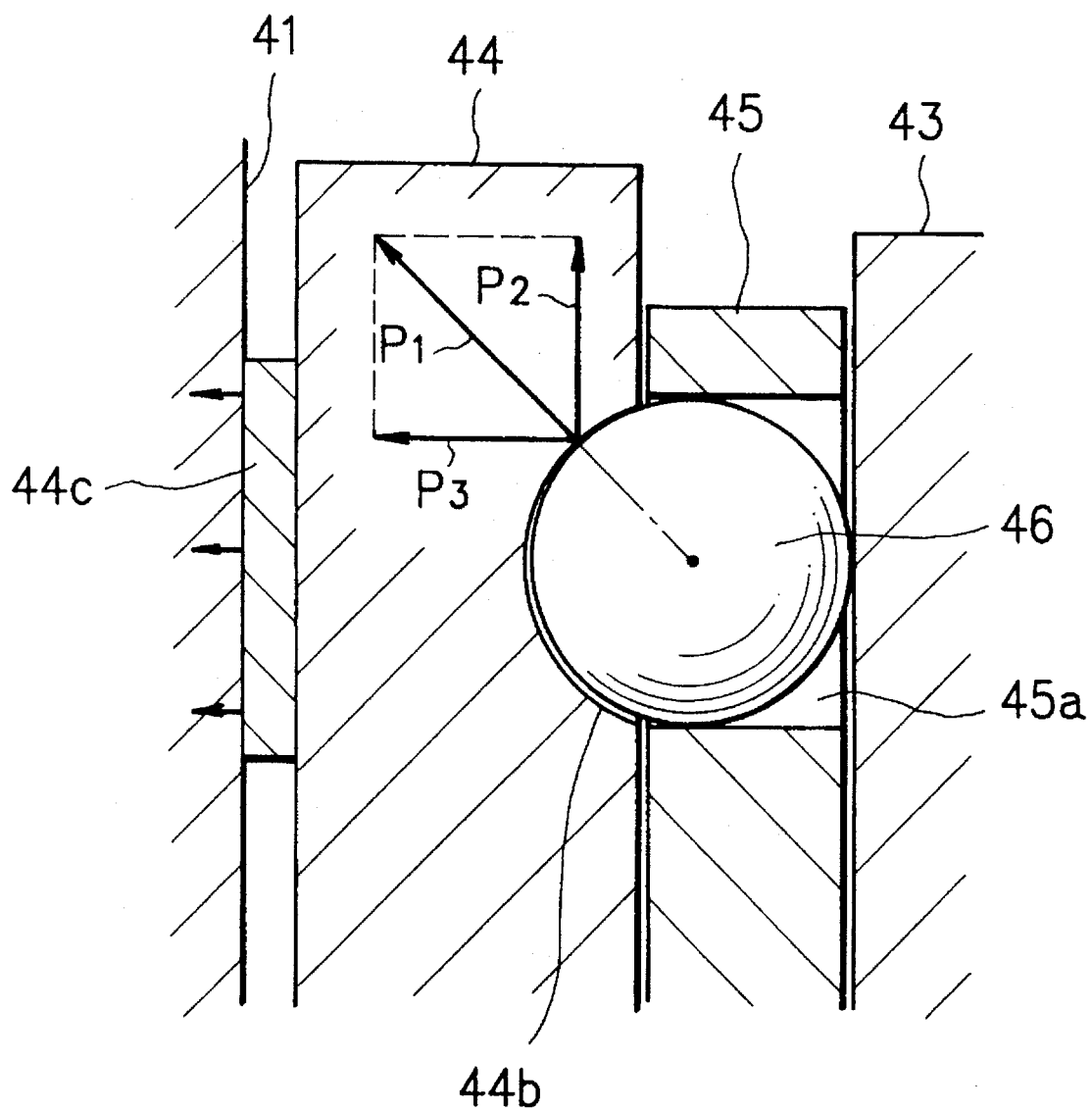
FIG. 28 is an operational explanatory drawing indicating the reaction force given to the ball from the ball groove.

In the above construction, as shown in FIG. 25, when the gear case 40 is rotated around the shaft center by the externally-input driving force, the eccentric disk 45 rotates around the shaft center of the gear case 40 and this rotating force is transmitted to each output disk 43 or 44 by the balls 46 fitted to the ball grooves 43b and 44b of individual output disks 43 and 44. In this case, if a rotational difference is given to the output disks 43 and 44 through the bevel gears 43a and 48 and each pinion gear 49, the rotation of one output disk is converted into the reverse direction by the self-rotation of each pinion gear 49, so that the output disks 43 and 44 rotate in the same direction around the rotary shaft Z1 of the gear case 40 as shown in FIG. 26. That is, on the opposite surfaces of one output disk 43 and the eccentric disk 45, some balls 46 retained by the eccentric disk 45 are fitted to the ball grooves 43b of the output disk 43 as shown in FIG. 27. When the output disk 43 rotates, each ball 46 rolls along the ball grooves 43b of the output disk 43 according to the offset value of the rotational center of the eccentric disk 45. At this time, at the contact point between the balls 46 and ball grooves 43b, the ball grooves 43b move toward the tangent line D1 of the circle with the rotary shaft Z1 as the center and the balls 46 move toward the tangent line D1 of the circle with the offset rotary shaft Z2 as the center. This motion is also performed on the opposite surfaces of the other output disk 44 and the eccentric disk. On the other hand, when a rotational difference occurs on individual output disks 43 and 44 as described before, the ball grooves 43b and 44b roll the balls 46 and the eccentric disk 45 follows the roll of the balls 46 and turns in the same direction as the output disks 43 and 44 around the shaft Z2 offset to the foregoing rotary shaft Z1. Consequently, the differential rotation of the output disks. 43 and 44 is attained through individual bevel gears 43a and 48 and each pinion gear 49. At this time, for example, if the force necessary to cause a rotational difference is given to the output disks 43 and 44 only from one output disk 43 through the bevel gears 43a and 48 and pinion gear 49, thereby causing only one output disk 43 to rotate, the balls 46 being a driven side at differential rotation cause the ball grooves 44b being a driving side to follow their own motion on the other output disk. Accordingly, these balls 46 receive reaction force from the ball grooves 44b which works as a resistance to limit the differential rotation of the output disks 43 and 44. Concretely, as shown in FIG. 28, the vertical force P1 to the contact surface with the balls 46 is given to the ball grooves 44b and its force components are the vertical force P2 to the shaft center of the output disk 44 and the parallel force P3 to the shaft center of the output disk 44. Accordingly, the reaction force given to the balls 46 from the ball grooves 44b is divided into components P1 and P3. In the case of this exemplary embodiment, P3 is specially large and acts as a thrust load to bring the output disk 44 into contact with the thrust washer 44c by pressure. The magnitude of reaction given to the balls 46 from the ball grooves 44b, namely, the magnitude of differential limitation effect can be optionally set to a desired value by changing the contact angle between the balls 46 and ball grooves 44b.

Figure 29:
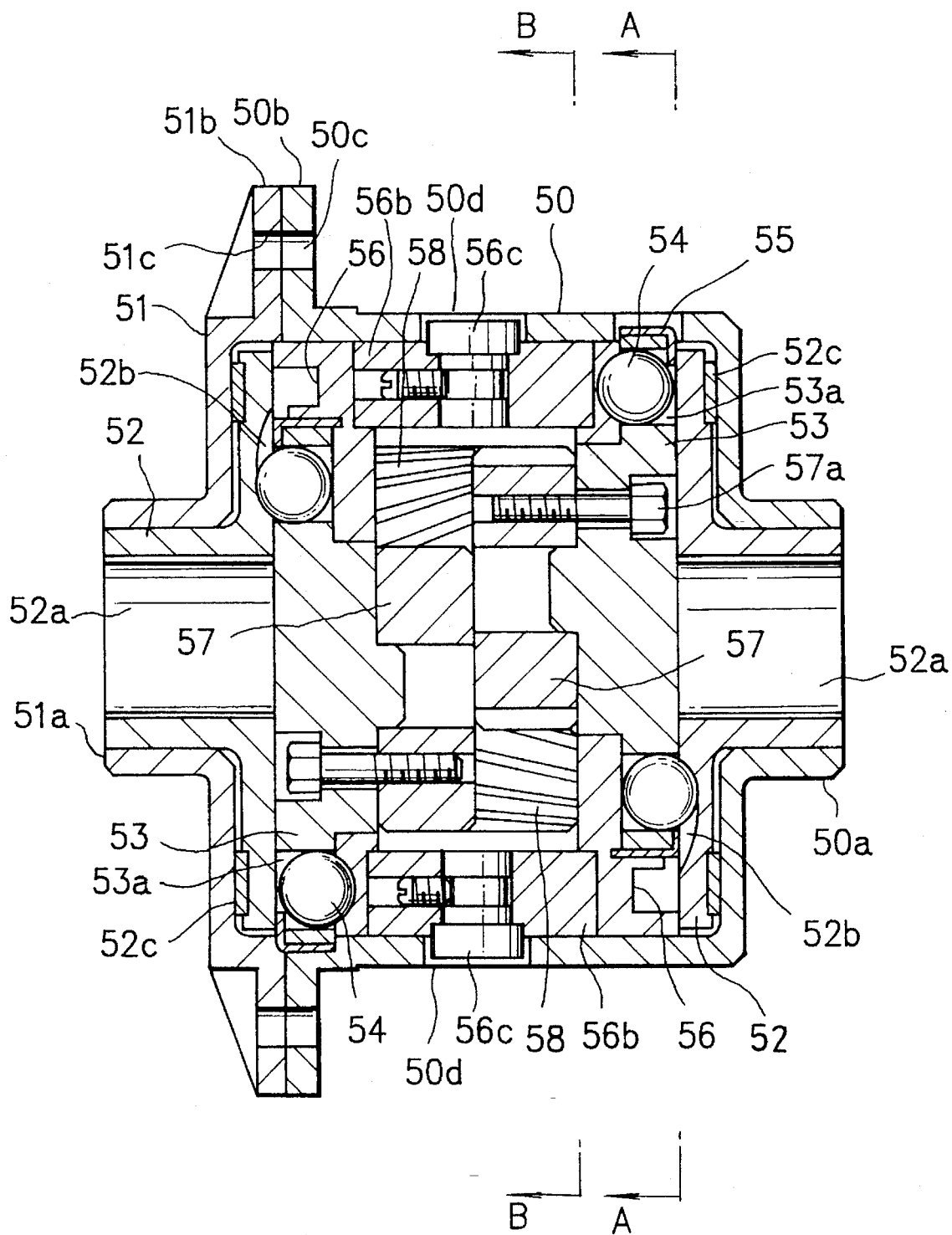
FIG. 29 is a side sectional view of the differential gear, indicating the fifth exemplary embodiment of this invention.
Figure 30:
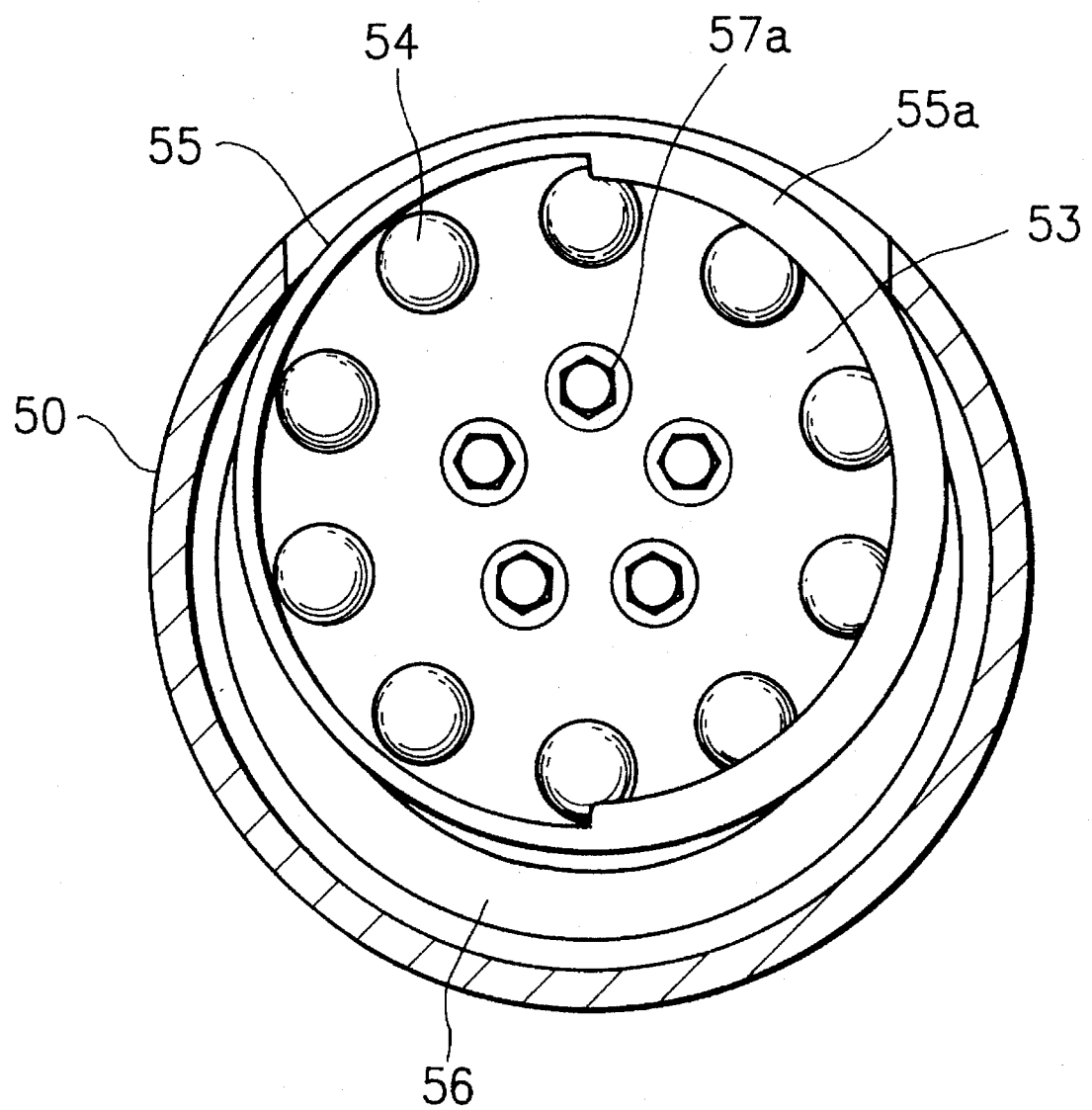
FIG. 30 is a sectional view along the arrow in the direction A—A of FIG. 29
Figure 31:
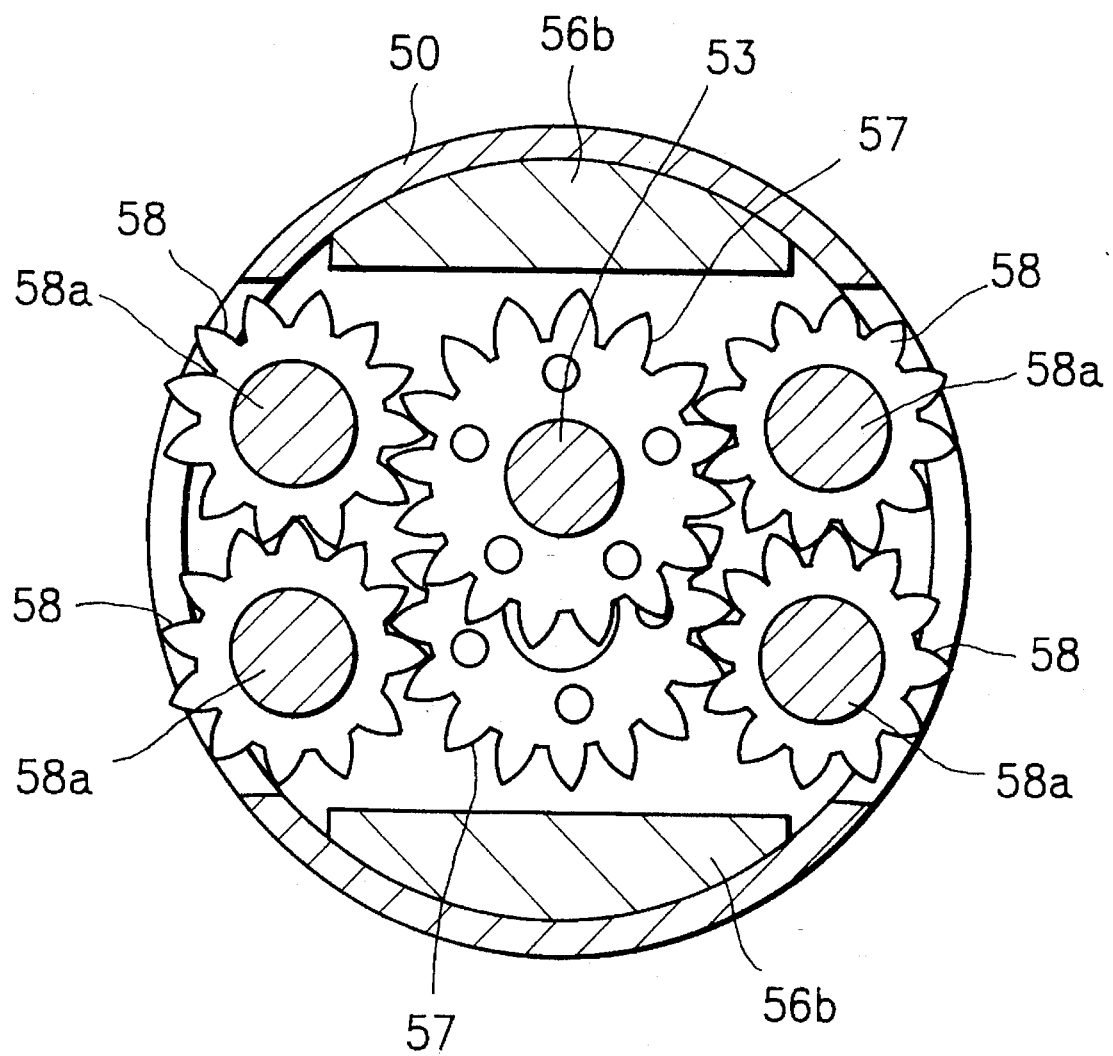
FIG. 31 is an exploded sectional view along the arrow in the direction B—B of FIG. 29.
Figure 32:
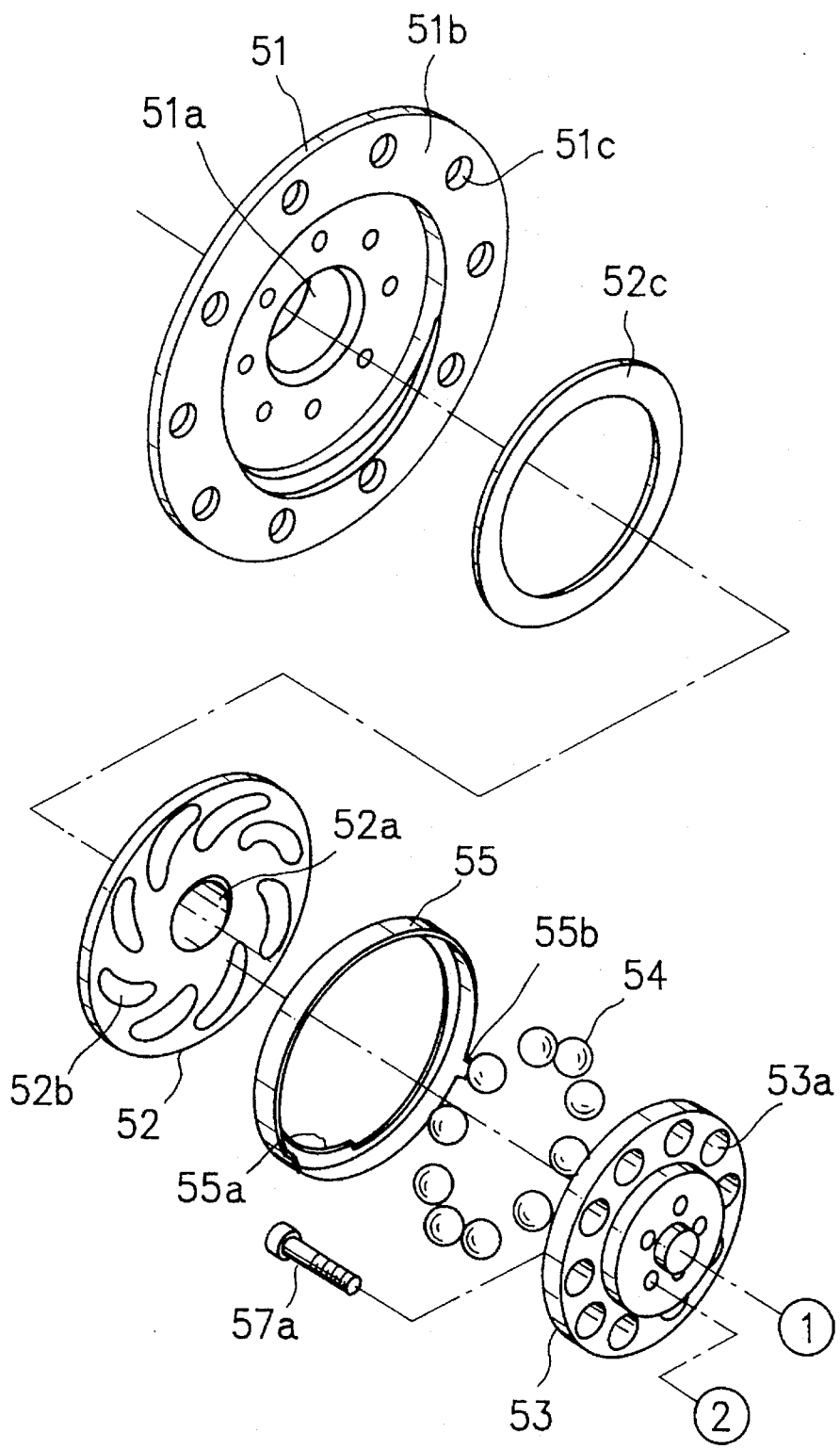
FIG. 32 is an exploded perspective view of the differential gear.
Figure 33:
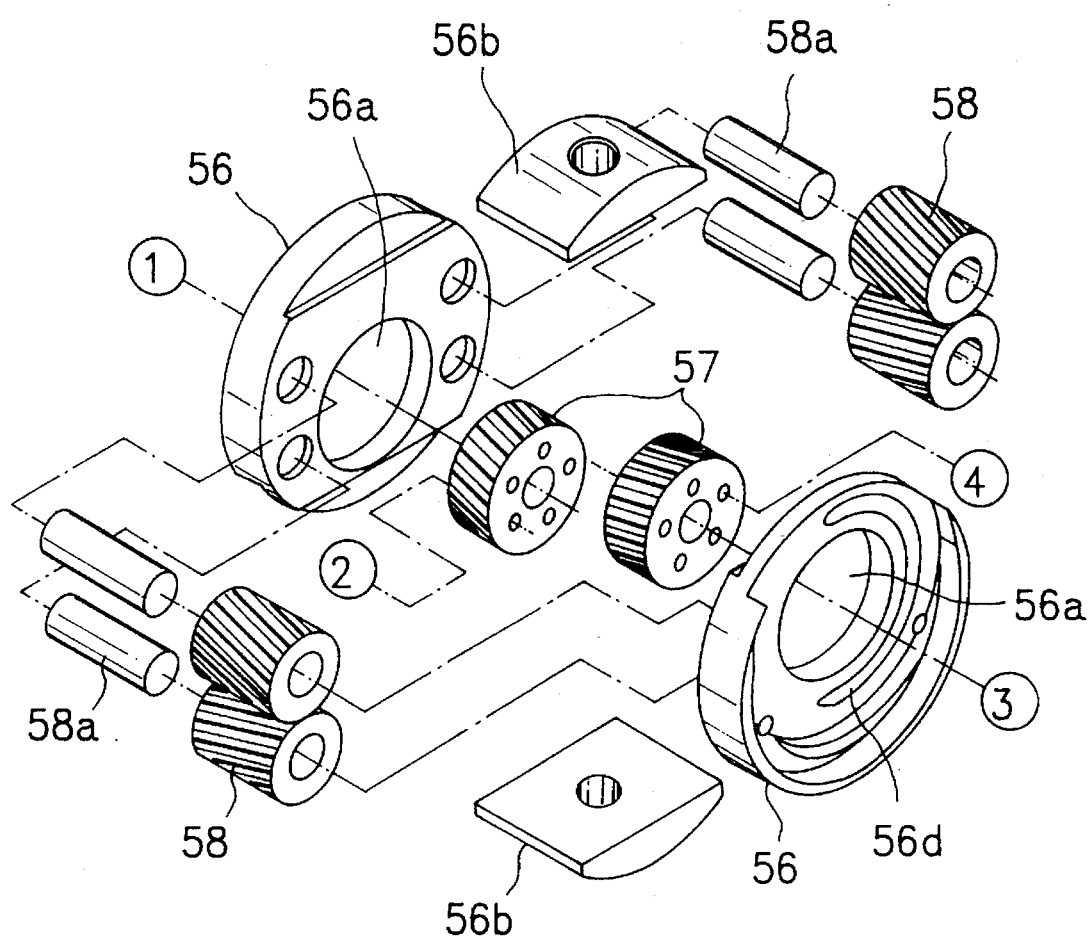
FIG. 33 is an exploded perspective view of the differential gear.
Figure 34:
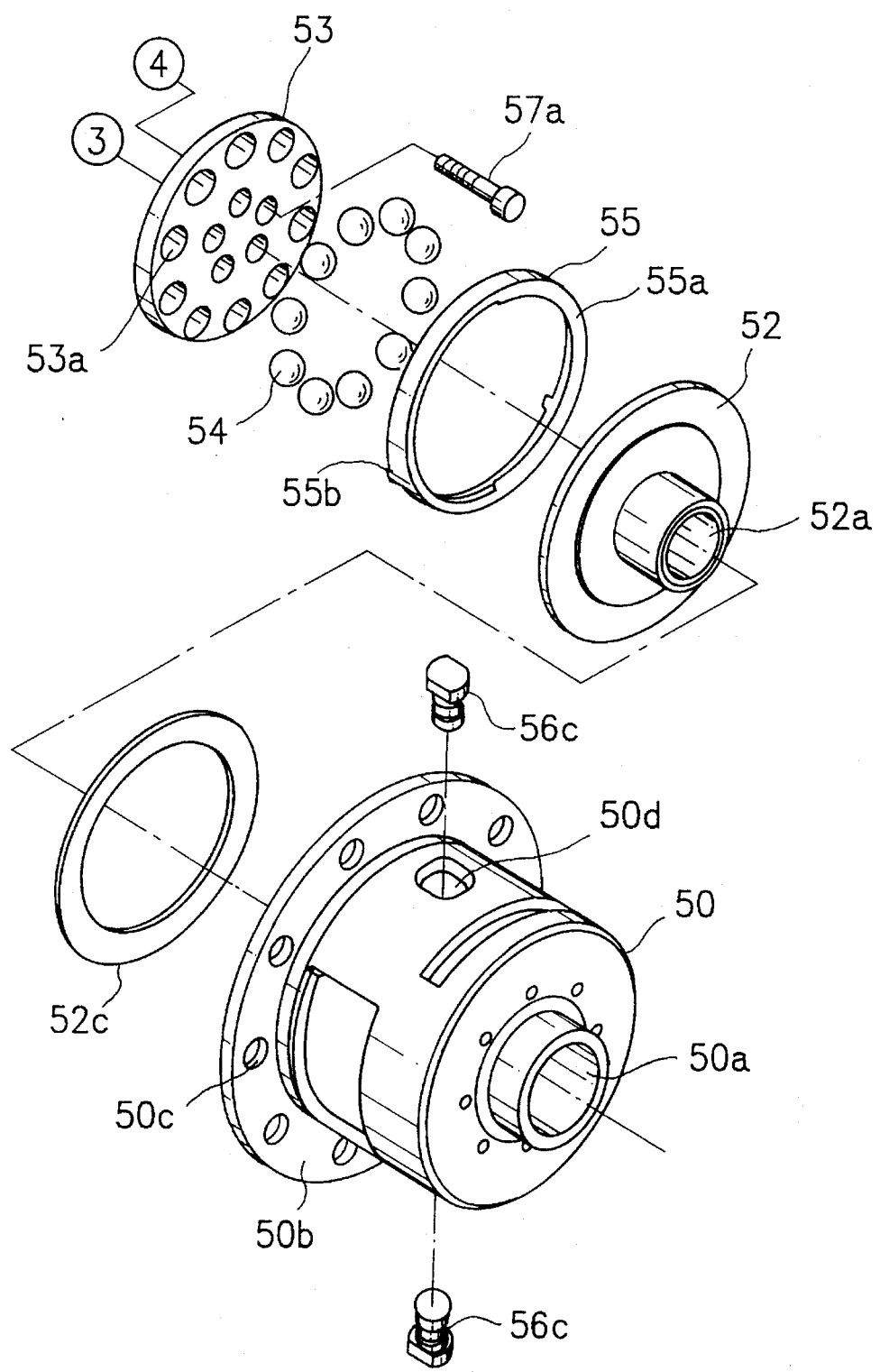
FIG. 34 is an exploded perspective view of the differential gear.

FIGS. 29 to 34 show the fifth exemplary embodiment of this invention. FIG. 29 is a side sectional view of the differential gear. FIG. 30 is a sectional view along the arrow in the direction A—A of FIG. 29. FIG. 31 is a sectional view along the arrow in the direction B—B of FIG. 29. FIGS. 32 to 34 are exploded perspective views of the differential gear. In FIGS. 32 to 34, the chain line denotes the continuation of the same number corresponding to each figure.

This differential gear consists of a gear case 50 being an input-side rotary body, a gear case cover 51 blocking one end of the gear case 50, a pair of output disks 52 being output-side rotary bodies arranged in opposite form to each other on the shaft center of the gear case 50, a pair of eccentric disks 52 arranged on the shaft and offset to the shaft center of the gear case 50, numerous balls 54 retained by each eccentric disk 53 in freely-movable form, a pair of guard rings 55 covering the edge of each eccentric disk 53, a pair of disk holders 56 to retain each eccentric disk 53 in freely-rotatable form, a pair of driving-side helical gears 57 installed on the rotary shaft of each eccentric disk 53, and a total of four driven-side helical gears 58 arranged around each driving-side helical gear 57.

The gear case 50 is composed of a cylindrical material with an opening at one end. At its other, a bearing 50a to retain a part of one output disk 52 is provided. At the opening of the gear case 50, a flange 50b is formed and numerous holes 50c for bolt insertion are provided on the flange 50b. Holes 50d to fix each disk holder 56 are provided around the gear case 50.

The gear case cover 51 is shaped in discoidal form. At its center, a bearing 51a to retain a part of the other output disk 52 is provided. A flange 51b is formed on the edge of the gear case cover 51 and numerous holes 51C for bolt insertion are provided on the flange 51b.

Each output disk 52 is arranged in opposite form to the other, interposed between each eccentric disk 53 and helical gears 57 and 58. On the opposite side, a connecting section 52a to the driving shaft (not illustrated) is provided. On the opposite surface of each output disk 52, numerous ball grooves 52b fitted to the balls 54 are formed and each ball groove 52b describes a curve with a specified curvature curved in the same direction. In this case, the opposite surface of each output disk 52s itself is of the same shape, but after assembly, is arranged in the reverse direction, so that the ball grooves 52b of each output disk 52 are curved in the opposite direction to the shaft center of each output disk 52. A thrust washer 52c is interposed between the rear side of each output disk 52 and the gear case cover 51. In each eccentric disk 53, one end face is in opposite form to each output disk 52 and arranged on the shaft offset by a specified distance from the shaft center of each output disk 52.

On each eccentric disk 53, numerous ball holes 52a to house each ball 54 are provided in through-form and each ball hole 53a is arranged at equal intervals in a line in the circumferential direction. The center of the other end face of each eccentric disk 53 protrudes a little toward the shaft center.

Each ball 54 has a slightly smaller diameter than the ball hole 53a of each eccentric disk 53 and is placed in each ball hole 53a in freely-rollable form.

The edge of each guard ring 55 is bent in the direction of the diameter and covers the one-end side edge of each eccentric disk 53. On the half side of the circumferential direction of each guard ring 55, a guard wall 55a to cover the ball holes 53a of each eccentric disk 53 is provided.

Each disk holder 56 is shaped in discoidal form interposed between the helical gears 57 and 58. On each disk holder 56, a hole 56a is provided at the position offset by a specified distance from the center. When the center of the other end face of each eccentric disk 53 is inserted into this hole 56a, each eccentric disk 56 is retained in freely-rotatable form in the eccentric status. In this case, each eccentric disk 56 is deflected alternately to the shaft center of the gear case 50. Each disk holder 56 is retained at specified intervals by a pair of spacers 56b. When each spacer 56b is fixed with the pin 26c inserted into the hole 50d of the gear case 50, each disk holder 56 is fixed in the gear case 50. On one end face of each disk holder 56, a guide groove 56d to hold the balls 54 of the eccentric disk 53 is provided at the position corresponding to the guard wall 55a of each guard ring 55 so that the balls 54 of the eccentric disk 53 may be placed in the guide grooves 56d according to the protrusion of the guard wall 55a to the disk holder 56 side. In this case, the balls 54 without the guard wall 55a are protruded to each output disk 52 side by the flat portion of the disk holder 56, so that the balls 54 of each eccentric disk 53 are fitted to the ball grooves 52b of each output disk 52, by approximately half each in the circumferential direction.

Each helical gear 57 on the driving side is arranged between the disk holders 56 and fixed at each eccentric disk 53 with a bolt 57a. Each helical gear 57 is deflected alternately to the shaft center of the gear case 50 like each eccentric disk 53.

Each helical gear 58 on the driven side is arranged between the disk holders 56 and retained by the shaft 28a parallel to the rotary shaft of the helical gear 57 in freely-rotatable form. Each helical gear 58 has a length ranging between both helical gears 57 on the driving side, and a pair of two helical gears are engaged simultaneously with the helical gears 57 on the driving side. In this case, an even number of driven-side helical gears 58 are interposed between the driving-side helical gears 57, so that the rotation of each eccentric disk 53 is converted mutually into the reverse direction. That is, a reversal mechanism is constituted by helical gears 57 and 59.

In the above construction, when the gear case 50 is rotated around the shaft center by externally-input driving force, each eccentric disk 53 rotates around the shaft center of the gear case 50 and this rotating force is transmitted to each output disk 52 by the balls 54 fitted to the ball grooves 52b of each output disk 52. In this case, if a rotational difference occurs on each output disk 52, the ball grooves 52 of each output disk roll the balls 54, and each eccentric disk 53 rolls in the same direction as the output disk 52 following the rolling of the balls 54. In this case, the rotation of each eccentric disk 53 is converted in the reverse direction to each other through the helical gears 57 and 58, so that each output disk 52 rotates in the reverse direction to each other. This allows the differential rotation of each output disk to be attained. At this time, if the force required to cause a rotational difference is given to each output disk 52 only from one output disk 52, the balls 54 of the driven side cause the ball grooves 52b of the driving side to follow their own motion on the other output disk 52. Accordingly, these balls 56 receive reaction force from the ball grooves 52b which works as a resistance to limit the differential rotation of each output disk 52. In the case of this exemplary embodiment, as in the fourth exemplary embodiment, the reaction force given to the balls 56 from the ball grooves 52b acts mainly as the force parallel to each output disk 52, namely, as a thrust load to bring each output disk 52 into contact with the thrust washer 52c by pressure. The magnitude of reaction given to the balls 54 from the ball grooves 52b, namely, the magnitude of differential limitation effect can be set optionally to a desired value by changing the contact angle value between the balls 54 and ball grooves 52b as in the foregoing exemplary embodiment.

What is claimed is:

1. A differential limiting apparatus comprising:

an input-side rotary body that rotates around a shaft center from an externally-input driving force, an eccentric rotary body in rotatable form supported around a shaft offset to the shaft center of the input-side rotary body, a pair of output-side rotary bodies arranged on the shaft center of the input-side rotary body facing both end faces of the eccentric rotary body, a plurality of balls retained in numerous holes provided at equal intervals in the circumferential direction on both end faces of the eccentric rotary body, said balls being rotatable within each hole, a guide section to support the balls retained by the eccentric rotary body from both end faces of the eccentric rotary body at a specified position in the circumferential direction of the eccentric rotary body, a differential mechanism coupled to one output-side rotary body for coupling a rotation from the input driving force to said one output-side rotary body, and numerous grooves on each output-side rotary body to rotate the eccentric rotary body in a specified direction with respect to a rotational difference between said output side rotary bodies, by guiding the balls protruded from both end faces of the eccentric rotary body when said one output-side rotary body rotates in the same direction at a different rotational speed through the differential limiting mechanism.

2. A differential apparatus as claimed in claim 1, wherein said differential mechanism includes a pair of bevel gears arranged opposite to each other on the shaft center of the one output-side rotary body and at least one pinion gear that rotates around an axis intersecting the rotary shaft of each bevel gear at a right angle, said pinion coupling the bevel gears.

* * * * *